(12) United States Patent
Kohchi et al.

(10) Patent No.: US 7,495,682 B2
(45) Date of Patent: Feb. 24, 2009

(54) IMAGE READING APPARATUS AND IMAGE FORMING APPARATUS

(75) Inventors: Masashi Kohchi, Tokyo (JP); Yasuo Sakurai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 11/174,668

(22) Filed: Jul. 6, 2005

(65) Prior Publication Data

US 2006/0008295 A1 Jan. 12, 2006

(30) Foreign Application Priority Data

Jul. 9, 2004 (JP) .............................. 2004-202998

(51) Int. Cl.
| | |
|---|---|
| B41J 2/385 | (2006.01) |
| B41J 2/41 | (2006.01) |
| B41J 15/14 | (2006.01) |
| B41J 2/435 | (2006.01) |
| B41J 27/00 | (2006.01) |
| G02B 26/08 | (2006.01) |

(52) U.S. Cl. ...................... 347/115; 347/152; 347/242; 347/245; 347/257; 359/198

(58) Field of Classification Search ................. 347/115, 347/242, 152, 257, 245; 359/198
See application file for complete search history.

(56) References Cited

U.S. PATENT DOCUMENTS

| | | | |
|---|---|---|---|
| 4,638,987 A | 1/1987 | Sakurai | |
| 4,715,597 A | 12/1987 | Sakurai | |
| 4,904,862 A * | 2/1990 | Bertagne | 250/216 |
| 5,822,105 A * | 10/1998 | Kodama et al. | 359/201 |
| 6,271,869 B1 * | 8/2001 | Tada et al. | 347/116 |
| 6,731,896 B2 | 5/2004 | Kohchi | |
| 6,779,725 B2 | 8/2004 | Kohchi et al. | |
| 6,940,078 B2 * | 9/2005 | Yasuda et al. | 250/484.4 |
| 7,081,912 B2 * | 7/2006 | Seki et al. | 347/244 |

(Continued)

FOREIGN PATENT DOCUMENTS

EP 0 716 535 A2 6/1996

(Continued)

OTHER PUBLICATIONS

U.S. Appl. No. 11/452,217, filed Jun. 14, 2006, Sakurai.

*Primary Examiner*—Stephen D Meier
*Assistant Examiner*—Sarah Al-Hashimi
(74) *Attorney, Agent, or Firm*—Oblon, Spivak, McClelland, Maier & Neustadt, P.C.

(57) ABSTRACT

An image reading apparatus, including point light sources, arranged in a straight line state, configured to output light to light a document, and a light leading member, positioned in front in a light outputting direction of the light output from the point light sources, configured to receive the light incident on a surface of the light leading member, and to lead the received light so as to irradiate along a main scanning direction toward the document. The light leading member includes a positioning unit configured to make a gap between one of the point light sources arranged in a line state and the light leading member the same as a gap between another of the point light sources and the light leading member, and to make an arrangement direction of the point light sources be positioned along a longitudinal direction of the light leading member.

26 Claims, 10 Drawing Sheets

U.S. PATENT DOCUMENTS

| | | | |
|---|---|---|---|
| 2003/0052960 A1* | 3/2003 | Okazaki | 347/238 |
| 2003/0189960 A1* | 10/2003 | Kitaoka et al. | 372/36 |
| 2004/0057027 A1* | 3/2004 | Tani | 353/102 |
| 2004/0212672 A1* | 10/2004 | Satoh et al. | 347/234 |
| 2005/0088707 A1 | 4/2005 | Sakurai et al. | |
| 2005/0129436 A1* | 6/2005 | Kohchi et al. | 399/376 |
| 2006/0008295 A1 | 1/2006 | Kohchi et al. | |

FOREIGN PATENT DOCUMENTS

| | | |
|---|---|---|
| EP | 1 158 761 A1 | 11/2001 |
| EP | 1 227 652 A1 | 7/2002 |
| JP | 7-162586 | 6/1995 |
| JP | 10-322521 | 12/1998 |

* cited by examiner

IMAGE READING APPARATUS AND IMAGE FORMING APPARATUS

BACKGROUND OF THE INVENTION

1. Field of the Invention

The present invention relates to an image reading apparatus having plural point light sources arranged in a straight line state and an image reading apparatus having the light reading apparatus.

2. Description of the Related Art

As an image reading apparatus used for an image forming apparatus such as a copying machine, one having a structure where plural LEDs (point light sources) lighting a document are arranged in a straight line state is known conventionally. See Japanese Patent Application Laid-Open Publication Nos. 07-162586 and 10-322521, for example. Furthermore, in a case where plural LEDs are used as light sources, in order to prevent the generation of illuminance ripple (unevenness of illumination distribution) in an arrangement direction of the LEDs at an object to be lighted, namely the document, a light leading member made of transparent resin, glass, or the like is arranged between the object to be lighted and the point light sources. The light leading member leads light irradiating from the point light sources and diffusing in a circle toward a surface of the document along a main scanning direction at the time when the document is read out, so that the light leading member can prevent the generation of the illuminance ripple.

However the inventions disclosed in the above-mentioned Japanese Patent Application Laid-Open Publications and others have a problem in that the surface of the document cannot be uniformly illuminated along the main scanning direction if a distance between the plural LEDs and the light leading member is not constant.

A state where the surface of the document is not being uniformly illuminated along the main scanning direction due to the distance between the LEDs and the light leading member not being constant is discussed with reference to FIG. 1 through FIG. 3. The lighting device of this optical reading apparatus, as shown in FIG. 1, includes an LED array substrate 102 and a light leading member 103. In the LED array substrate 102, plural LEDs (point light sources) 100 are arranged and fixed on a substrate 101. The light leading member 103 is positioned in front of an outputting direction of light output from the LED 100. The LED array substrate 102 and the light leading member 103 are attached to a housing member 104.

The light output from the LEDs 100 is led by the light leading member 103 so as to be irradiated along the main scanning direction of the document D provided on a contact glass 105. Reflection light from the document D is read out at a CCD (photoelectric conversion element) via a mirror 106 or lens (not shown) so that image information corresponding to the image of the document D can be obtained.

FIG. 2 shows a case where a position relationship between the light leading member 103 and the LED array substrate 102 is shifted from a proper position. The direction of the shift causes the distance between the LEDs and the light leading member 103 to be not constant. In this case, an amount of light, incident on the light leading member 103 after the light is output from the LEDs 100 at the position where the distance between the light leading member 103 and the LED 100 is short is large. The amount of light, incident on the light leading member 103 after the light is output from the LEDs 100 at the position where the distance between the light leading member 103 and the LED 100 is long is small. Because of this, an amount of light, incident on the document D after the light is output from the light leading member 103 at a side where the distance between the light leading member 103 and the LED 100 is short is large. An amount of light incident on the document D after the lights is output from the light leading member 103 at a side where the distance between the light leading member 103 and the LED 100 is long is small. Arrows shown in FIG. 2 show light beams incident on the document D and led by the light leading member 103 after the light beams are output from the corresponding LEDs 100. A length of each arrow represents an amount of the irradiated light.

FIG. 3 shows a case where a position relationship between the light leading member 103 and the LED array substrate 102 is shifted from a proper position.

A direction of the shift causes the arrangement direction of the LEDs 100 and the longitudinal direction of the light leading member 103 to be twisted. In this case, the light beams output from the LEDs arranged in the center of the arrangement direction are incident on the light leading part 103, led by the light leading member 103, and incident on the document D. However, the light beams output from the LEDs 100 positioned at both end sides in the arrangement direction are not incident in the light leading member 103. The document D is not lighted at either end side in a longitudinal direction of the light leading member 103.

SUMMARY OF THE INVENTION

Accordingly, it is a general object of the present invention to provide a novel and useful image reading apparatus and image forming apparatus.

Another and more specific object of the present invention is to provide an image reading apparatus and image forming apparatus whereby plural point light sources equally face the light leading member so that the document is uniformly irradiated along the main scanning direction by the light led by the light leading member after the light is output from the point light source.

The above object of the present invention is achieved by an image reading apparatus, including:

a plurality of point light sources, arranged in a straight line state, configured to output light for lighting a document situated on a contact glass from a lower side of the contact glass;

a light leading member, positioned in front in a light outputting direction of the light output from the point light sources, configured to lead the light output from the point light sources so as to irradiate along a main scanning direction toward the document situated on the contact glass; and a photoelectric conversion element configured to receive reflection light from the document;

wherein the light leading member includes positioning-means configured to make a gap between each of the point light sources arranged in a line state and the light leading member constant and make an arrangement direction of the point light sources be positioned along a longitudinal direction of the light leading member.

According to the above-mentioned image reading apparatus, the lights beams from the point light sources are uniformly incident on the light leading member. It is possible to uniformly light the document along a main scanning direction of the document by the light that is led by the light leading member after being output from the point light source.

The image reading apparatus may further include:

a point light source array substrate where the point light sources are provided in the line state;

wherein the positioning means is formed by a holding part and a contact standard surface;

the holding part is provided in the light leading member;

the holding part has a mounting surface extending in parallel with the longitudinal direction of the light leading member, the mounting surface being where the point light source array substrate is mounted; and the contact standard surface is formed in the light leading member and has a structure where a contact surface formed in the substrate contacts the contact standard surface by mounting the point light source array substrate on the mounting surface.

According to the above-mentioned image reading apparatus, by mounting the point light source array substrate on the mounting surface of the holding part, it is possible to makes an arrangement direction of the plural point light sources consistent with the longitudinal direction of the light leading member. In addition, by contacting the contact surface formed in the substrate with the contact standard surface of the light leading member, it is possible to make a gap between each of the point light sources and the light leading member 31 constant. Thus, the light beams from the point light sources are uniformly incident on the light leading member. It is possible to uniformly light the document along a main scanning direction of the document by the light that is led by the light leading member after being output from the point light source.

The image reading apparatus may further include:

a point light source array substrate where the point light sources are provided in the line state;

wherein the positioning means is formed by an insertion concave part and a contact standard surface;

the insertion concave part is provided in the light leading member and extends in parallel with the longitudinal direction of the light leading member; and a contact surface formed in the substrate contacts the contact standard surface formed deep in the insertion concave part by inserting the substrate in the insertion concave part.

According to the above-mentioned invention, by inserting the substrate in the insertion concave part, it is possible to makes an arrangement direction of the plural point light sources consistent with the longitudinal direction of the light leading member. In addition, by contacting the contact surface formed in the substrate with the contact standard surface formed deep in the insertion concave part, it is possible to make a gap between each of the point light sources and the light leading member 31 constant. Thus, the light beams from the point light sources are uniformly incident on the light leading member. It is possible to uniformly light the document along a main scanning direction of the document by the light that is led by the light leading member after being output from the point light sources. Furthermore, a bend of the substrate can be corrected by inserting the substrate in the insertion concave part. Therefore, a gap between the point light source and the light leading member generated due to the bend of the substrate can be prevented. Therefore, lighting for the document can be further uniformly done along the main scanning direction of the document.

The image reading apparatus may further include:

a point light source array substrate where the point light sources are provided in the line state;

wherein the positioning means is formed by an insertion concave part and an incident surface of the light leading member;

the insertion concave part is provided in the light leading member and extends in parallel with the longitudinal direction of the light leading member; and an emitting surface of each of the point light source contacts the incident surface by inserting the substrate in the insertion concave part.

According to the above-mentioned invention, by inserting the substrate in the insertion concave part, it is possible to makes an arrangement direction of the plural point light sources consistent with the longitudinal direction of the light leading member. In addition, by contacting the emitting surface of the point light sources with the incident surface of the light leading member, it is possible to make a gap between each of the point light sources and the light leading member 31 be constant. Thus, the light beams from the point light sources are uniformly incident on the light leading member. It is possible to uniformly light the document along a main scanning direction of the document by the light that is led by the light leading member after being output from the point light sources. Furthermore, a bend of the substrate can be corrected by inserting the substrate in the insertion concave part. Therefore, a gap between the point light sources and the light leading member generated due to the bend of the substrate can be prevented. Therefore, lighting for the document can be further uniformly done along the main scanning direction of the document.

The image reading apparatus may further include:

a point light source array substrate where the point light sources are provided in the line state;

wherein the positioning means is formed by a holding part and a plurality of installation screw holes;

the holding part is provided in the light leading member;

the holding part has a mounting surface extending in parallel with the longitudinal direction of the light leading member, the mounting surface being where the point light source array substrate is mounted; and the installation screw holes are formed in the holding part, face a plurality of positioning holes formed in the substrate, and have a structure where fixing screws inserted in the positioning holes are screw-fixed with the installation screw holes, by mounting the point light source array substrate on the mounting surface.

According to the above-mentioned invention, by mounting the point light source array substrate on the mounting surface of the holding part, it is possible to make an arrangement direction of the plural point light sources consistent with the longitudinal direction of the light leading member. In addition, by facing the installation screw hole formed in the holding part toward the positioning hole formed in the substrate and fixing the fixing screw inserted in the positioning hole with the installation screw hole, it is possible to make a gap between each of the point light sources and the light leading member 31 constant. Thus, the light beams from the point light sources are uniformly incident on the light leading member. It is possible to uniformly light the document along a main scanning direction of the document by the light that is led by the light leading member after being output from the point light source.

One of a plurality of positioning holes, situated in the center part in the longitudinal direction in the substrate, may have a circular hole shaped configuration having a substantially same outside diameter as the fixing screw;

a length along the longitudinal direction in the substrate of the other positioning hole may be longer than a diameter of the fixing screw; and the length along a direction perpendicular to the longitudinal direction in the substrate of the other positioning hole may be the substantially same as the diameter of the fixing screw.

According to the above-mentioned invention, even if a thermal expansion difference is generated between the holding part and the substrate depending on the change of the temperature, generation of a bend of the holding part or the substrate due to this thermal expansion difference can be prevented. Hence, a position gap between the point light sources and the light leading member based on the bend due to the thermal expansion difference can be prevented. Because of this, lighting for the document can be further uniformly done along the main scanning direction of the document.

The positioning means may be formed by a holding part and a wiring pattern;

the holding part may be provided in the light leading member;

the holding part may have a mounting surface extending in parallel with the longitudinal direction of the light leading member; and the wiring pattern may be formed on the mounting surface and is connected to the point light source.

According to the above-mentioned invention, by forming the wiring pattern on the mounting surface provided in the light leading member and extending the wiring pattern in parallel with a longitudinal direction of the light leading member and by connecting the point light sources to the wiring pattern, it is possible to makes an arrangement direction of the plural point light sources consistent with the longitudinal direction of the light leading member and to make a gap between each of the point light sources and the light leading member 31 constant. Thus, the light beams from the point light sources are uniformly incident on the light leading member. It is possible to uniformly light the document along a main scanning direction of the document by the light that is led by the light leading member after being output from the point light source.

The image reading apparatus may further include:

a holding member having a plurality of press-fitting concave parts for the point light sources;

wherein the point light sources are press-fitted in the press-fitting concave parts;

the positioning means is formed by a holding part and a contact standard surface;

the holding part is provided in the light leading member and has a mounting surface extending in parallel with a longitudinal direction of the light leading member;

a wiring pattern is formed on the mounting surface; and a contact surface formed in the holding member contacts the contact standard surface formed on the light leading member, by mounting the holding member wherein the point light source is light press fitted in the press-fitting concave part for the point light source, on the mounting surface so that the point light source is connected to the wiring pattern.

According to the above-mentioned invention, by mounting the holding member, wherein the point light source is light press fitted in the press-fitting concave part for the point light source, on the mounting surface so that the point light source is connected to the wiring pattern, it is possible to make an electrical connection to the point light source. Furthermore, it is possible to make an arrangement direction of the plural point light sources consistent with the longitudinal direction of the light leading member. In addition, by contacting the contact surface of the holding member with the contact standard surface of the light leading member, it is possible to make a gap between each of the point light sources and the light leading member constant. Thus, the light beams from the point light sources are uniformly incident on the light leading member. It is possible to uniformly light the document along a main scanning direction of the document by the light that is led by the light leading member after being output from the point light source. The point light sources are simply light-press fitted to the corresponding press-fitting concave parts for the point light sources of the holding member. Hence, if a certain point light source does not work, only the point light source which does not work is exchanged. Hence, it is not necessary to exchange the entirety of plural point light sources. It is also not necessary to exchange the entirety of plural point light sources including the light leading member. Hence, the maintenance when a point light source does not work can be implemented at low cost.

A press-fitting concave part for a peripheral circuit element where the peripheral circuit element is light-press-fitted may be formed in the holding part; and the peripheral circuit element which is light-press-fitted in the press-fitting concave part for the peripheral circuit element may be connected to the wiring pattern.

According to the above-mentioned invention, it is possible to make an electrical connection between the point light source and the peripheral circuit element and therefore it is possible to achieve the same effect as the effect achieved by the invention claimed in claim 8. Furthermore, since the peripheral circuit elements are simply light-press-fitted to the corresponding press-fitting concave parts of the holding member, if a certain peripheral circuit element does not work, only the peripheral circuit element which does not work is exchanged. Since only the wiring pattern 61 is formed on the mounting surface of the holding part, it is not necessary to solder-fix the peripheral circuit elements.

The holding member may be made of metal.

It is possible to improve transferability and radiation-ability of heat generated by the point light source and the peripheral circuit elements, so that it is possible to prevent the performance of the point light source and the peripheral circuit elements from degrading due to the influence of the heat.

The holding member may have a heat radiation part.

It is possible to improve radiation-ability of heat generated by the point light source and the peripheral circuit element, so that it is possible to prevent the performance of the point light source and the peripheral circuit element from degrading due to the influence of heat.

The image reading apparatus may further include:

a holding member having a plurality of press-fitting concave parts for the point light sources, the press-fitting concave parts being parts into which the point light sources are press-fitted; and a substrate where a wiring pattern is formed;

wherein the positioning means is formed by a holding part and a positioning pin;

the holding part is provided in the light leading member and has a mounting surface extending in parallel with the longitudinal direction of the light leading member in a state where the substrate and the holding member are stacked;

the positioning pin is fixed to the-holding part so as to pierce the substrate and the holding member for position fixing; and the substrate is mounted on the mounting surface, in a state where the point light source light-press-fitted in the press-fitting concave part is connected to the wiring pattern.

According to the above-mentioned invention, by mounting the holding member, wherein the point light sources are press-fitted in the press-fitting concave parts, and the substrate on the mounting surface of the holding part, it is possible to makes an arrangement direction of the plural point light sources consistent with the longitudinal direction of the light leading member. In addition, by position fixing the holding member mounted on the mounting surface and the substrate by the positioning pin fixed to the holding part, it is possible to make a gap between each of the point light sources and the light leading member 31 constant. Thus, the light beams from the point light sources are uniformly incident on the light leading member. It is possible to uniformly light the document along a main scanning direction of the document by the light that is led by the light leading member after being output from the point light sources. Furthermore, since the wiring pattern is formed on an exclusive substrate, a special process for forming the wiring pattern on the mounting surface of the holding part is not necessary so that productivity can be improved.

The positioning pin may be formed in a body with the holding part.

According to the above-mentioned invention, it is possible to improve positioning precision between the holding member and the holding part by the positioning pin. Because of this, it is possible to uniformly light the document along a main scanning direction of the document.

The above-mentioned object of the present invention is achieved by an image forming apparatus, including:

an image reading apparatus; and a printer engine configured to form an image on a recording medium corresponding to image data read by the image reading apparatus;

wherein the image reading apparatus includes a plurality of point light sources, arranged in a straight line state, configured to output light for lighting a document situated on a contact glass from a lower side of the contact glass;

a light leading member, positioned in front in a light outputting direction of the light output from the point light source, configured to lead the light output from the point light source so as to irradiate along a main scanning direction toward the document situated on the contact glass; and a photoelectric conversion element configured to receive reflection light from the document;

wherein the light leading member includes positioning means configured to cause a gap between each of the point light sources arranged in a line state and the light leading member to be made constant and make an arrangement direction of the point light sources be positioned along the longitudinal direction of the light leading member.

According to the above-mentioned invention, it is possible to form the image corresponding to the stable image reading result by the image reading apparatus. Therefore, it is possible to improve the formed image quality.

Other objects, features, and advantages of the present invention will become more apparent from the following detailed description when read in conjunction with the accompanying drawings.

DETAILED DESCRIPTION OF THE PREFERRED EMBODIMENTS

A description of the present invention and details of drawbacks of the related art are now given, with reference to FIG. 4 through FIG. 22, including embodiments of the present invention.

Figure 1:
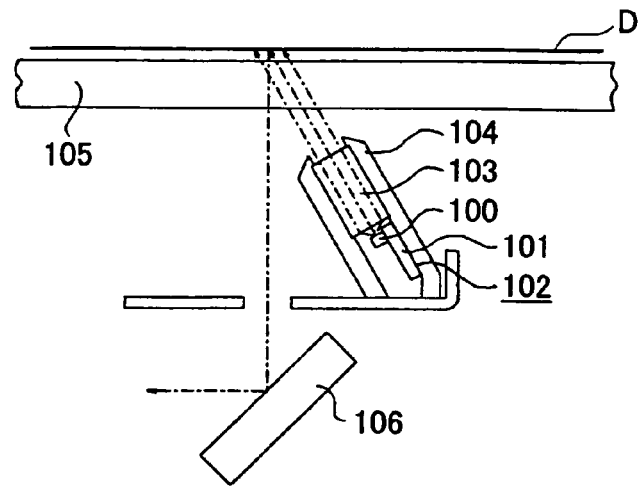
FIG. 1 is a longitudinal sectional view of a related art lighting device.
Figure 2:
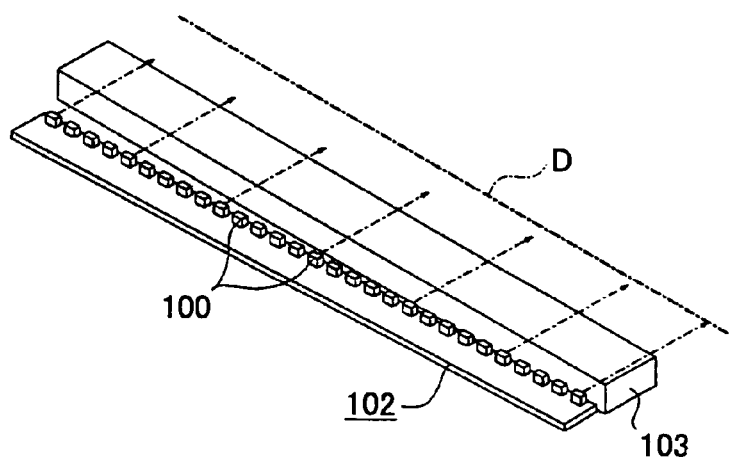
FIG. 2 is a perspective view showing a case where a light leading member and an LED array substrate are shifted in a direction where a distance between LEDs and the light leading member is not constant.
Figure 3:
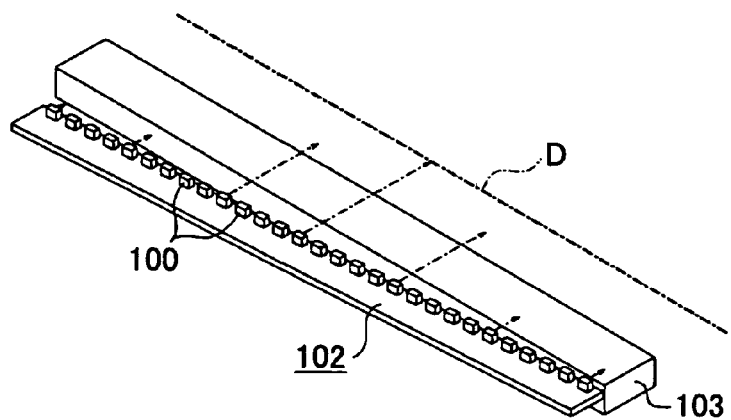
FIG. 3 is a perspective view showing a case where the light leading member and the LED array substrate are shifted in a direction where an arrangement direction of the LEDs and a longitudinal direction of the light leading member are twisted.
Figure 4:
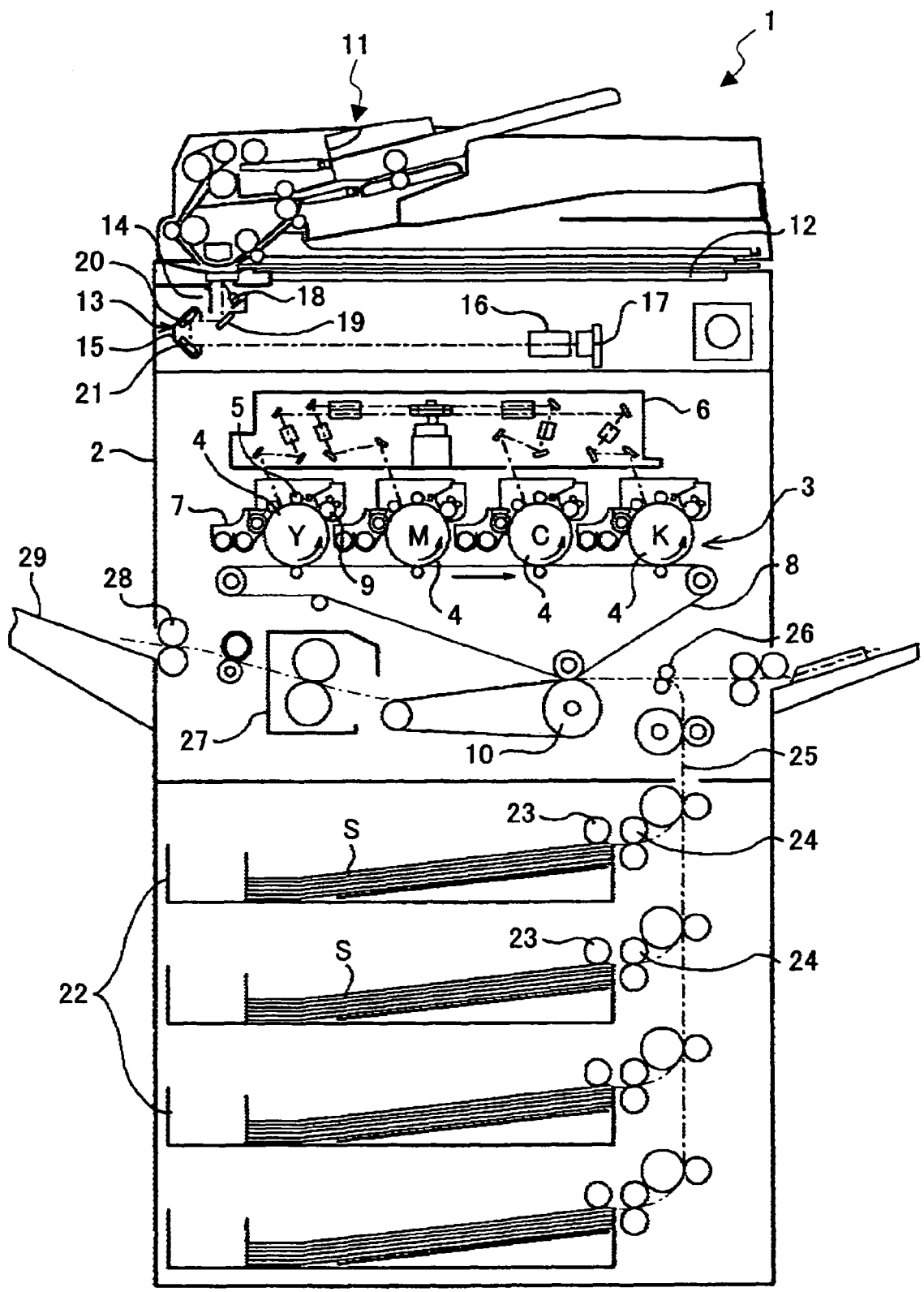
FIG. 4 is a schematic front view of an internal structure of a full-color copying machine 1 of a first embodiment of the present invention.
Figure 5:
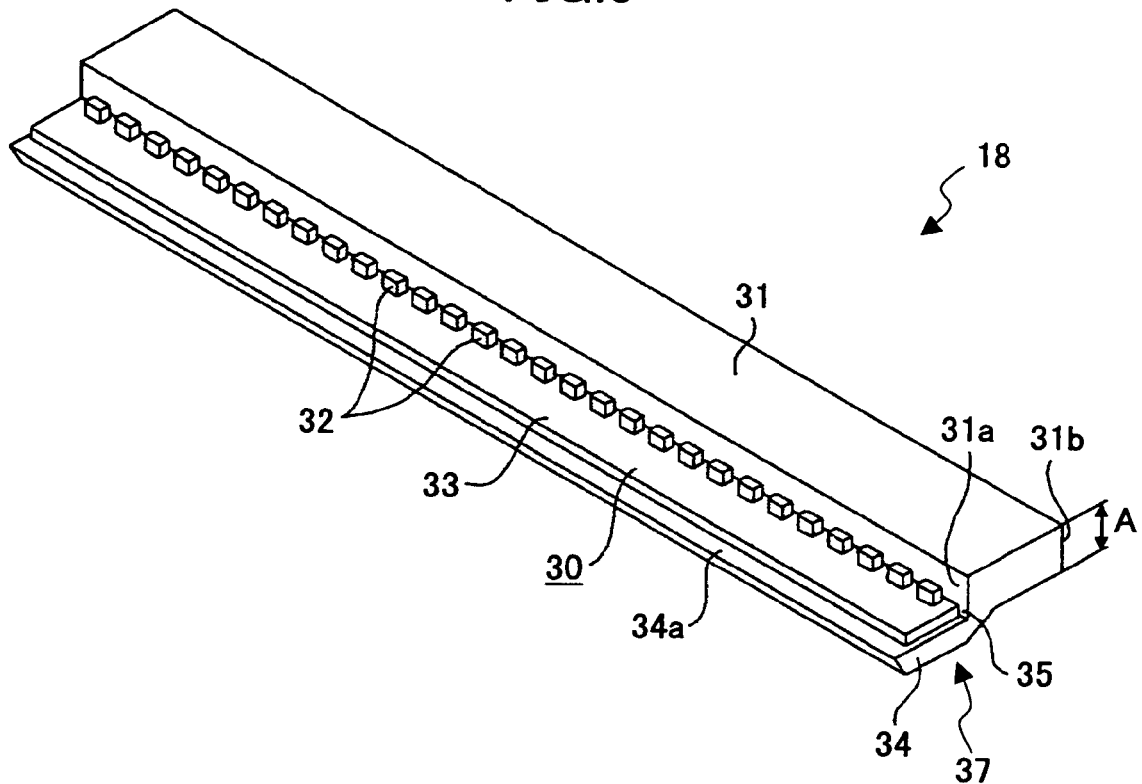
FIG. 5 is a perspective view of a structure of a lighting device.
Figure 6:
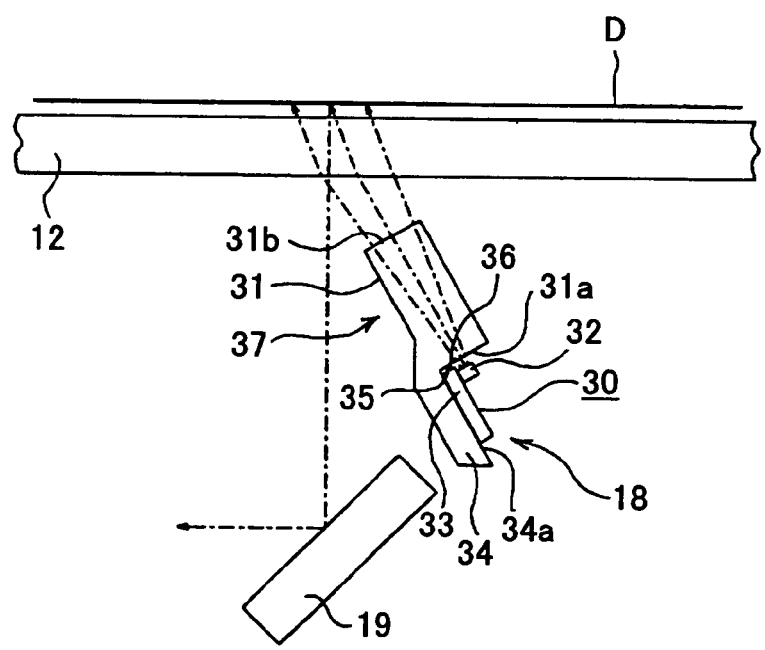
FIG. 6 is a longitudinal sectional view of the lighting device.

A first embodiment of the present invention is discussed with reference to FIG. 4 through FIG. 6. FIG. 4 is a schematic front view of an internal structure of a full-color copying machine 1 of a first embodiment of the present invention. FIG. 5 is a perspective view of a structure of a lighting device. FIG. 6 is a longitudinal sectional view of the lighting device 18.

A printer engine 3 for forming a color image is provided in a central part in an apparatus body 2 of the copying machine 1. This printer engine 3 includes: four drum-like photosensitive members 4 that are arranged in parallel horizontally to be spaced apart at an equal interval; charging rollers 5 that form toner images on outer peripheral surfaces of the photosensitive members 4; an exposing device 6 that exposes the uniformly charged outer peripheral surfaces of the photosensitive members 4 to a laser beam according to image data to thereby form electrostatic latent images on the outer peripheral surfaces; developing devices 7 that supply toner to the electrostatic latent images so as to change the electrostatic latent images to toner images; an intermediate transfer belt 8 on which toner images formed on the outer peripheral surfaces of the respective photosensitive members 4 are sequentially transferred; cleaning devices 9 that removes the toner remaining on the photosensitive members 4 after the toner images are transferred onto the intermediate transfer belt 8; a transfer roller 10 that transfers the toner image on the intermediate transfer belt 8 onto a recording medium S, and others. Toner images of Y (yellow), M (magenta), C (cyan), and B (black) are formed in the four photosensitive members 4, respectively. The toner images of these colors are respectively transferred onto the intermediate transfer belt 8 in turn so that a color toner images is formed on the intermediate transfer belt 8 and the color toner image is transferred to the recording medium S.

An ADF (automatic document feeder) 11, which automatically feeds a document D that is the object to be lighted by the lighting device 18, a contact glass 12 where the document D is provided, and an image reading apparatus 13 which reads the document automatically fed by the ADF 11 or the document placed on the contact glass 12, are arranged above the apparatus body 12.

The image reading apparatus 13 includes: first and second traveling bodies 14 and 15 that are capable of traveling at speeds in the ratio of 2:1 in parallel with the contact glass 12; a lens 16; and a CCD 17 serving as a photoelectric conversion element. The first traveling body 14 is equipped with a lighting device 18 for lighting a surface of the document D placed on the contact glass 12 or the document conveyed by the ADF 11 and a first mirror 19 that reflects light reflected on the surface of the document D and traveling along a reading optical axis. The second traveling body 15 is mounted with a second mirror 20 and a third mirror 21 that further reflect the light reflected by the first mirror 19. The lens 16 and the CCD 17 are arranged in a traveling direction of the reading light sequentially reflected by the first through third mirrors 19, 20, and 21. The CCD 17 receives a reflection light (reading light) reflected by the document D after the light is output from the lighting device 18 to the document D.

Sheet cassettes 22 of plural stages, for example, four stages, in which recording media S are stored, are provided below the apparatus body 2. The recording media S stored in these sheet cassettes 22 are separated and fed one by one by pickup rollers 23 and feed rollers 24. The separated and fed sheets are conveyed along a sheet conveying path 25 provided in the apparatus body 2. A registration roller 26, the transfer roller 10, a fixing device 27, a discharge roller 28, and the like are arranged along this sheet conveying path 25.

Depending on the conveyance timing and timing for image-forming on the intermediate transfer belt 8, the registration roller 26 is intermittently rotated. By stopping the rotation of the registration roller 26, the recording medium conveyed to the sheet conveying path 25 is stopped for a while and the recording medium S is sent out by rotating the registration roller 26. The recording medium S sent out by the rotation of the registration roller 26 is conveyed to a transferring position that is put between the intermediate transfer belt 8 and the transfer roller 10.

The fixing device 27 applies heat and pressure to the recording medium S where the toner image is transferred so that the toner is melted. As a result of this, the toner image is fixed to the recording medium S.

Under this structure, an action for forming an image in the copying machine 1 is done as follows. First, forming of the toner image is started at the printer engine 3. At the time when the toner image is formed, first of all, the image of the document D placed on the contact glass 12 or automatically conveyed by the ADF 11 is read out by the image reading apparatus 13. In such a structure, laser beams corresponding to image data of respective colors (yellow Y, magenta M, cyan C, and black B) are emitted from semiconductor lasers of the exposing device 6 according to a result of reading by the image reading apparatus 13. The laser beams expose the outer peripheral surfaces of the respective photosensitive members 4 that are uniformly charged by the charging rollers 5, whereby electrostatic latent images are formed. Toners of the respective colors are supplied to the electrostatic latent images from the respective developing devices 7, whereby toner images of the respective colors are formed. The toner images on the respective photosensitive members 4 are sequentially transferred onto the intermediate transfer belt 8, which moves in synchronization with the photosensitive members 4, and a color toner image is formed on the intermediate transfer belt 8.

On the other hand, the recording medium S is started to be separated and fed from the inside of the sheet cassettes 22 before or after the start of the image forming operation in the printer engine. The recording medium S separated, fed, and conveyed through the sheet conveying path 25 is timed by the registration roller 26 that is driven to rotate intermittently so as to be sent to a transferring position between the intermediate transfer belt 8 and the transferring roller 10.

When the recording medium S is sent to the transferring position between the intermediate transfer belt 8 and the transfer roller 10, the color toner image on the intermediate transfer belt 8 is transferred onto the recording medium S. The recording medium S where the color toner image is transferred is conveyed on the sheet conveyance path 25 so that the color toner image is fixed on the recording medium S in a course of passing through the fixing device 27. The recording medium S having the color toner image fixed thereon is discharged onto a discharge tray 29 by the discharge roller 28.

Under this structure, the lighting device of this embodiment, as shown in FIG. 5 and FIG. 6, includes an LED array substrate 30 that is a point light source array substrate and a light leading member 31. The LED array substrate 30 includes a substrate 33 and plural LEDs 32 as light sources. The LEDs 32 are arranged and fixed in a straight line state at a designated equal pitch on the substrate 33 having a liner configuration. The LEDs 32 are arranged in a longitudinal direction of the substrate 33. This arrangement direction is consistent with a main scanning direction of the document D at the time when an image is read in a case where the lighting device 18 is installed in the image reading apparatus 13. In addition, a wiring pattern (not shown) where the fixed LEDs 32 are electrically connected is formed in the substrate 33. Furthermore, in this LED array substrate 30, a periphery circuit element (not shown) including an electric current limiting register is connected and fixed to the wiring pattern. Although a case where one line of the LEDs 32 is provided in the straight line state is discussed in this embodiment as an example, LEDs of plural lines along the direction consistent with the main scanning direction of the document D may be provided at the time when the image is read.

The light leading member 31 is made of transparent resin such as acrylic or polycarbonate, glass, or the like. The light leading member 31 is positioned in front of the outputting direction of the light output from the LEDs 32 to the document D. The light leading member 31 includes an incident surface 31a and outputting surface 31b. The light output from the LEDs 32 is incident on the incident surface 31a. The incident light is output toward the document D along the main scanning direction of the document D via the outputting surface 31b. The light leading member 31 has a linear configuration and extends along the arrangement direction of the LEDs 32.

A holding part 34 is formed in a body at a side of the incident surface 31a of the light leading member 31. The holding part 34 holds the LED array substrate 30 and extends along a longitudinal direction of the light leading member 31. In the holding part 34, a mounting surface is formed so as to be parallel to a longitudinal direction of the light leading member 31 and orthogonal to the incident surface 31a. The LED array substrate 30 is attached to the holding part 34 in a direction in which a bottom surface of the substrate 33 is mounted on the mounting surface 34a. The bottom surface of the substrate 33 and the mounting surface 34a are adhered by an adhesive or stuck by double-sided tape to each other, so that the LED array substrate 30 is fixed to the holding part 34.

An area which is a part of the incident surface 31a of the light leading member 31 and is adjacent to the mounting surface 34a works as a contact standard surface 35. A surface which is along a longitudinal direction of the substrate 33 and faces the contact standard surface 35 when the LED array substrate 30 is mounted on the mounting surface 34a is a contact surface 36, which contacts the contact standard surface 35. A positioning member 37 is formed in the light leading member 31. The positioning member 37 makes a gap between each of the LEDs 32 arranged in a line state and the light leading member 31 constant by the holding part 34 having the mounting surface 34a and the contact standard surface 35. The positioning member 37 also makes an arrangement direction of the LEDs 32 to be positioned along the longitudinal direction of the light leading member 31.

Under this structure, as shown in FIG. 5 and FIG. 6, the LED array substrate 30 is mounted on the mounting surface 34a of the holding part 34 and fixed to the holding part 34 by the adhesive or the double-sided tape. The bottom surface of the substrate 33 is mounted on the mounting surface 34a and the contact surface 36 of the substrate 33 contacts the contact standard surface 35 of the light leading member 31.

The mounting surface 34a is a surface extending in parallel with the longitudinal direction of the light leading member 31. Thus, by mounting the LED array substrate 30 on the mounting surface 34a, it is possible to position plural LEDs 32 and the light leading member 31 so that the arrangement direction of the LEDs 32 is consistent with the longitudinal direction of the light leading member 31. In addition, by contacting the contact surface of the substrate 33 with the contact standard surface 35 of the light leading member 31, it is possible for the gap between each of the LEDs 32 and the incident surface 31a of the light leading member 31 to be made constant. Because of this, the light beams from the LEDs 32 are incident on the incident surface 31a of the light leading member 31. It is possible to uniformly light the document D along a main scanning direction of the document D by the light that is led by the light leading member 31 after being output from the LEDs 32 and then output from the outputting surface 31b. Because of this, a light receiving property of a light received by a CCD 17 is improved and therefore it is possible to improve the quality of an image formed by the printer engine 3 based on a result of reading by the image reading apparatus 13.

In this embodiment, it is preferable that a fixing position of the LED array substrate 30 be positioned so that the LEDs 32 face the incident surface 31a at a substantially center position of a width "A" in a direction perpendicular to the longitudinal direction of the outputting surface 31b of the light leading member 31, namely a sub-scanning direction at the time of image reading.

Although the holding part 34 is uniformly formed with the light leading member 31 in this embodiment, the present invention is not limited to this. For example, the holding part 34 may be formed separately from the light leading member 31 and this holding part 34 may be fixed to the light leading member 31.

Figure 7:
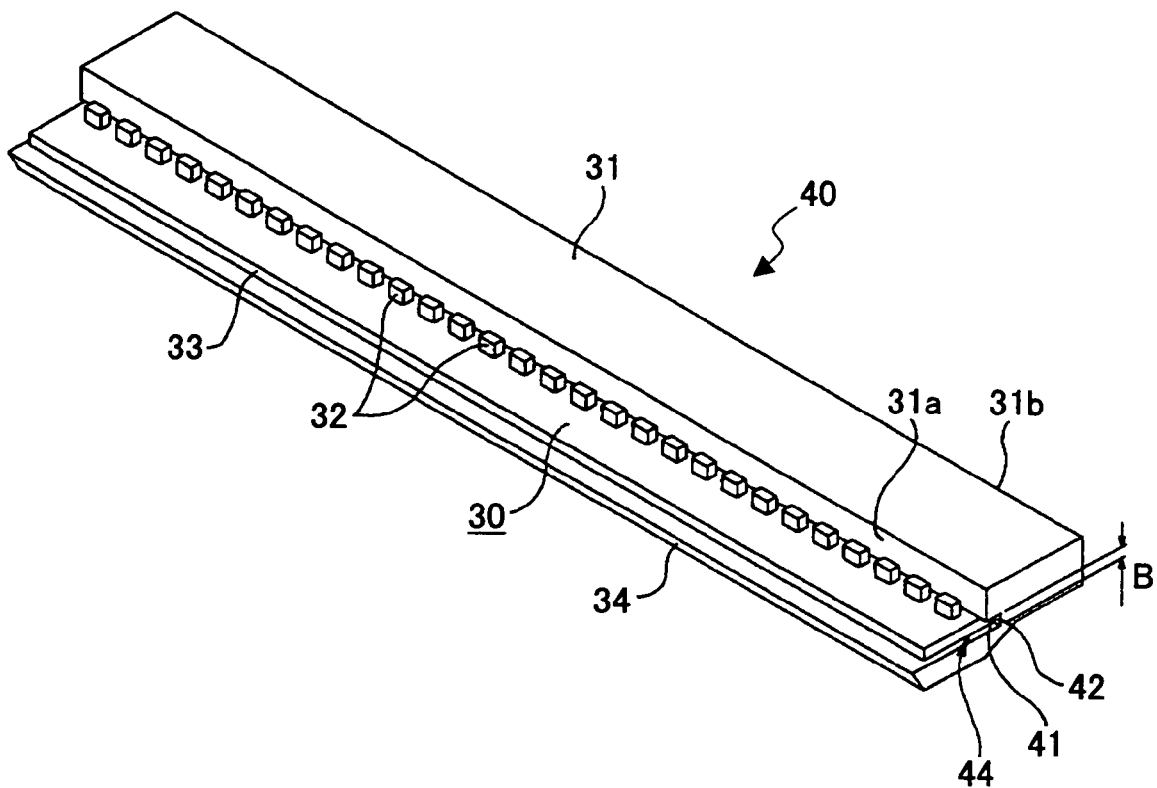
FIG. 7 is a perspective view showing a structure of a lighting device of a second embodiment of the present invention.
Figure 8:
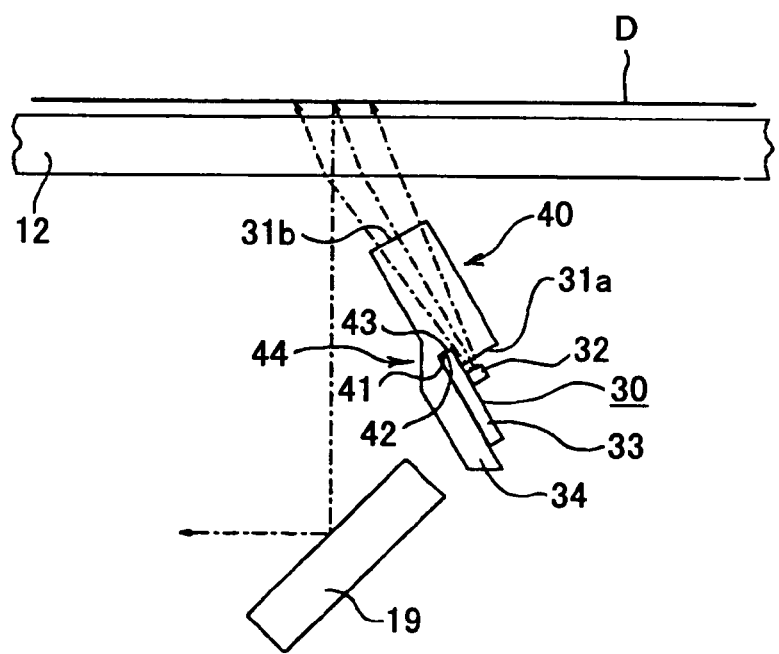
FIG. 8 is a longitudinal sectional view of the lighting device shown in FIG. 7.

Next, the second embodiment of the present invention is discussed with reference to FIG. 7 and FIG. 8. In FIG. 7 and FIG. 8, parts that are the same as the parts discussed above are given the same reference numerals, and explanation thereof is omitted. FIG. 7 is a perspective view showing a structure of the lighting device of the second embodiment of the present invention. FIG. 8 is a longitudinal sectional view of the lighting device shown in FIG. 7.

In this embodiment, a lighting device 40 is provided for lighting the document D situated on the contact glass 12 from a lower side of the contact glass 12. The image reading apparatus 13 (See FIG. 4) is formed by the lighting device 40 and the CCD 17 (See FIG. 4) reading a reflection light (reading light) reflected by the document D after the light output from the lighting device 40 is irradiated on the document D.

The lighting device 40 includes the LED array substrate 30 and the light leading member 31. The LED array substrate 30 includes plural LEDs 32. The LEDs 32 are arranged and fixed in a straight line state at a designated equal pitch on the substrate 33 having a liner configuration. The LEDs 32 are arranged in a longitudinal direction of the substrate 33. This arrangement direction is consistent with a main scanning direction of the document D at the time when an image is read in a case where the lighting device 40 is installed in the image reading apparatus 13.

The light leading member 31 is made of transparent resin such as acrylic or polycarbonate, glass, or the like. The light leading member 31 is positioned in front of the outputting direction of the light output from the LEDs 32 to the document D. The light leading member 31 includes an incident surface 31a and outputting surface 31b. The light output from the LEDs 32 is incident on the incident surface 31a. The incident light is output toward the document D along the main scanning direction of the document D via the outputting surface 31b. The light leading member 31 has a linear configuration and extends along the arrangement direction of the LEDs 32.

The holding part 34 is formed in a body at the side of the incident surface 31a of the light leading member 31. The holding part 34 holds the LED array substrate 30 and extends along the longitudinal direction of the light leading member 31. In the holding part 34, the mounting surface is formed so as to be in parallel with the longitudinal direction of the light leading member 31 and orthogonal to the incident surface 31a. The LED array substrate 30 is attached to the holding part 34 in the direction in which a bottom surface of the substrate 33 is mounted on the mounting surface 34a. See FIG. 5.

A bottom surface forming a single surface with the mounting surface 34a is formed at a side of the incident surface 31a of the light leading member 31. An insertion concave part is formed at the side of the incident surface 31a of the light leading member 31 so as to extend in parallel with the longitudinal direction of the light leading member 31. A height "B" of the insertion concave part 41 is slightly greater than the thickness of the substrate 33. One side along the longitudinal direction of the substrate 33 is inserted into the insertion concave part 41 so that the LED array substrate 30 is fixed to the light leading member 31.

A surface deep in the insertion concave part 41 works as a contact standard surface 42 and extends in parallel with the longitudinal direction of the light leading member 31. A surface which is along a longitudinal direction in the substrate 33 and which is inserted in the insertion concave part 41 is a contact surface 43, which is made to contact the contact standard surface 42 by inserting the substrate 33 in the insertion concave part 41. A positioning member 44 makes a gap between each of the LEDs 32 arranged in a line state and the light leading member 31 constant by contact between the insertion concave part 41 and the contact standard surface 42. The positioning member 44 also causes an arrangement direction of the LEDs 32 position to be along the longitudinal direction of the light leading member 31.

Under this structure, as shown in FIG. 7 and FIG. 8, the LED array substrate 30 is fixed to the light leading part 31 by inserting the substrate 33 in the insertion concave part 41 so that the contact surface 43 of the substrate 33 contacts the contact standard surface 42 formed deep in the insertion concave part 41. The bottom surface of the substrate 33 contacts the mounting surface 34a of the holding part 34.

The insertion concave part 41 extends in parallel with the longitudinal direction of the light leading member 31. Hence, by inserting the substrate 33 of the LED array substrate 30 in the insertion concave part 41, it is possible to position plural LEDs 32 and the light leading member 31 so that the arrangement direction of the LEDs 32 is consistent with the longitudinal direction of the light leading member 31. In addition, by contacting the contact surface 43 of the substrate 33 with the contact standard surface 42 formed deep in the insertion concave part 41, it is possible for the gap between each of the LEDs 32 and the incident surface 31a of the light leading member 31 to be made constant. Because of this, the light beams from the LEDs 32 are uniformly incident on the incident surface 31a of the light leading member 31. It is possible to uniformly light the document D along a main scanning direction of the document D by the light that is led by the light leading member 31 after being output from the LED 32 and then output from the outputting surface 31b. Because of this, a light receiving property of a light received by a CCD 17 is improved and therefore it is possible to improve the quality of an image formed by the printer engine 3 based on a result of reading by the image reading apparatus 13.

Furthermore, according to this embodiment, a bend of the substrate 33 can be corrected by inserting the substrate 33 in the insertion concave part 41. Therefore, a gap between the LEDs 32 and the light leading member 31 generated due to the bend of the substrate 33 can be prevented. Therefore, lighting for the document D can be further uniformly done along the main scanning direction of the document D.

Figure 9:
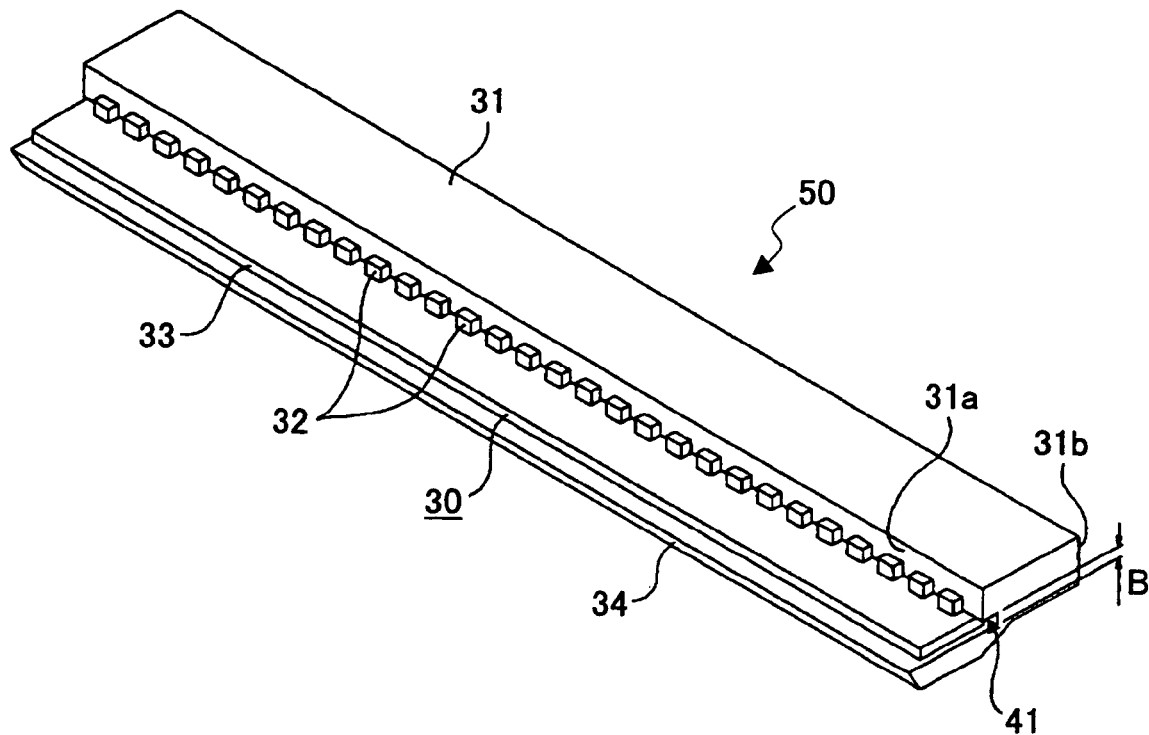
FIG. 9 is a perspective view showing a structure of a lighting device of a third embodiment of the present invention.
Figure 10:
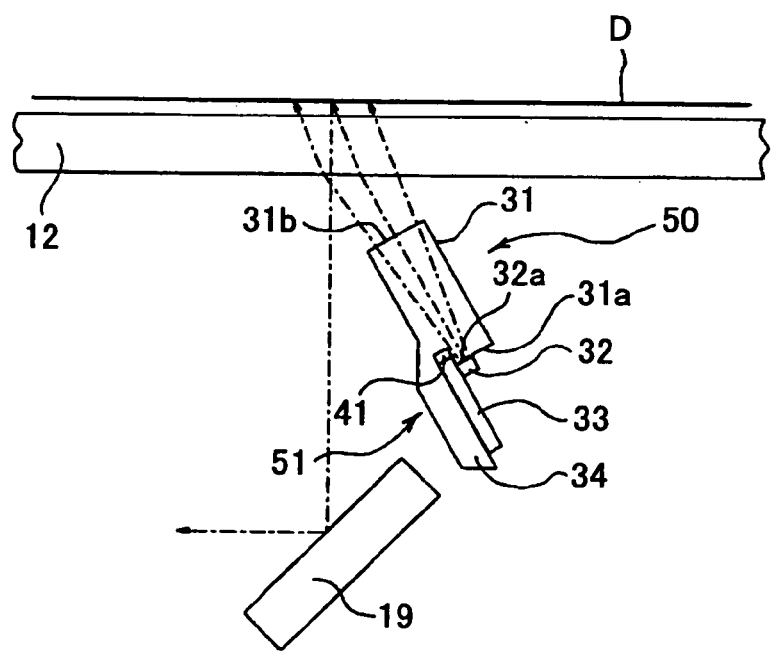
FIG. 10 is a longitudinal sectional view of the lighting device shown in FIG. 9.

Next, the third embodiment of the present invention is discussed with reference to FIG. 9 and FIG. 10. FIG. 9 is a perspective view showing a structure of the lighting device of the third embodiment of the present invention. FIG. 10 is a longitudinal sectional view of the lighting device shown in FIG. 9.

In this embodiment, a lighting device 50 is provided for lighting the document D situated on the contact glass 12 from a lower side of the contact glass 12. The image reading apparatus 13 (See FIG. 4) is formed by the lighting device 50 and the CCD 17 (See FIG. 4) reading a reflection light (reading light) reflected by the document D after the light output from the lighting device 50 is irradiated on the document D.

The lighting device 50 includes the LED array substrate 30 and the light leading member 31. The LED array substrate 30 includes plural LEDs 32. The LEDs 32 are arranged and fixed in a straight line state at a designated equal pitch on the substrate 33 having a linear configuration. The LEDs 32 are arranged in a longitudinal direction of the substrate 33. This arrangement direction is consistent with a main scanning direction of the document D at the time when image is read in a case where the lighting device 50 is installed in the image reading apparatus 13.

The light leading member 31 includes an incident surface 31a and outputting surface 31b. The light leading member 31 has a linear configuration and extends along the arrangement direction of the LEDs 32. The holding part 34 and the insertion concave part 41 are formed in the light leading member 31. A height "B" of the insertion concave part 41 is slightly greater than the thickness of the substrate 33. One side along the longitudinal direction of the substrate 33 is inserted in the insertion concave part 41 so that the LED array substrate 30 is fixed to the light leading member 31.

By inserting the substrate 33 in the insertion concave part 41 so that the LED array substrate 30 is fixed to the light leading member 31, an emission surface 32a of the LED 32 contacts the incident surface 31a of the light leading member 31 positioned at an entrance side edge part of the insertion concave part 41. A positioning member 51 makes a gap between each of the LEDs 32 arranged in a line state and the light leading member 31 constant by the insertion concave part 41 and the incident surface 31a positioned at the entrance side edge part of the insertion concave part 41. The positioning member 44 also makes an arrangement direction of the LEDs 32 to be positioned along the longitudinal direction of the light leading member 31.

Under this structure, as shown in FIG. 9 and FIG. 10, the LED array substrate 30 is fixed to the light leading part 31 by inserting the substrate 33 in the insertion concave part 41 so that the emission surface 32a of the LED 32 contacts the incident surface 31a of the light leading member 31 positioned at the entrance side edge part of the insertion concave part 41. The bottom surface of the substrate 33 contacts the mounting surface 34a of the holding part 34.

The insertion concave part 41 extends in parallel with the longitudinal direction of the light leading member 31. Hence, by inserting the substrate 33 of the LED array substrate 30 in the insertion concave part 41, it is possible to position plural LEDs 32 and the light leading member 31 so that the arrangement direction of the LEDs 32 is consistent with the longitudinal direction of the light leading member 31. In addition, by contacting the emission surface 32a of the LED 32 with the incident surface 31a of the light leading member 31, it is possible to make the gap between each of the emission surface 32a of the LEDs 32 and the incident surface 31a of the light leading member 31 constant (a length of the gap is "0"). Because of this, the light beams from the LEDs 32 are uniformly incident on the light leading member 31. It is possible to uniformly light the document D along a main scanning direction of the document D by the light that is led by the light leading member 31 after being output from the LED 32 and then output from the outputting surface 31b. Because of this, a light receiving property of a light received by a CCD 17 is improved and therefore it is possible to improve the quality of an image formed by the printer engine 3 based on a result of reading by the image reading apparatus 13.

Furthermore, according to this embodiment, a bend of the substrate 33 can be corrected by inserting the substrate 33 in the insertion concave part 41. Therefore, a gap between the LEDs 32 and the light leading member 31 generated due to the bend of the substrate 33 can be prevented. Therefore, lighting for the document D can be further uniformly done along the main scanning direction of the document D.

Figure 11:
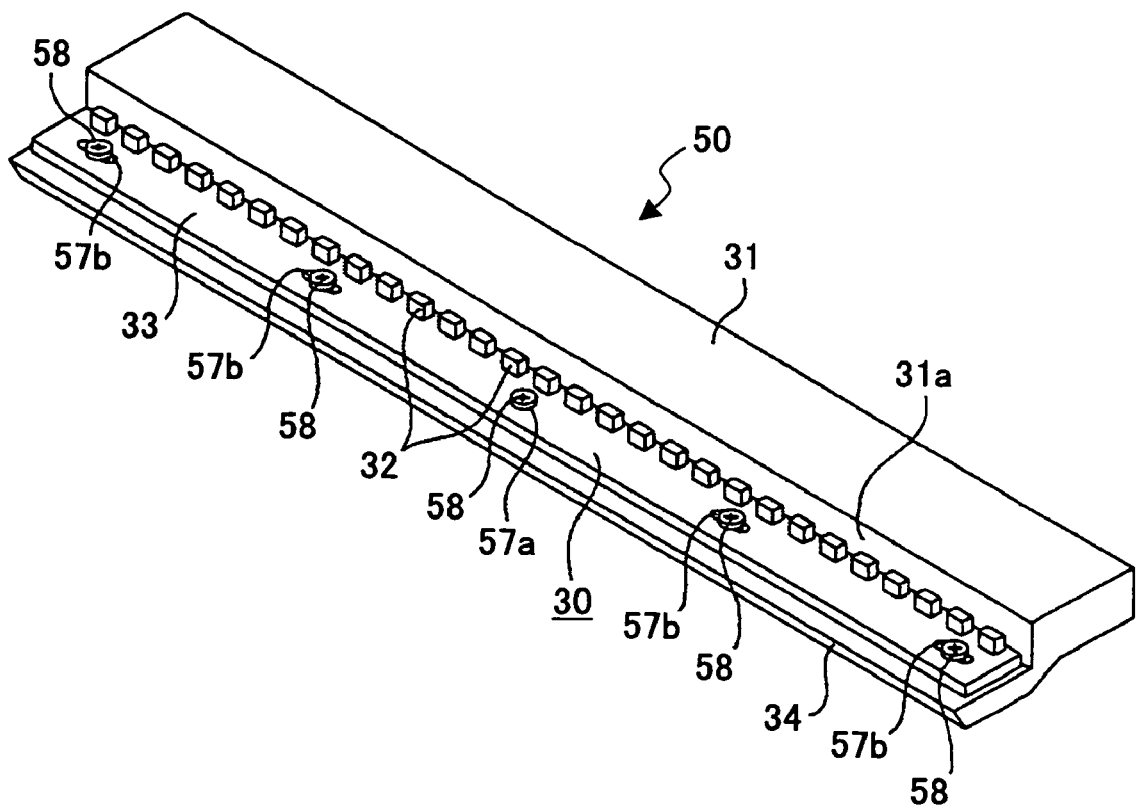
FIG. 11 is a perspective view showing a structure of a lighting device of a fourth embodiment of the present invention.
Figure 12:
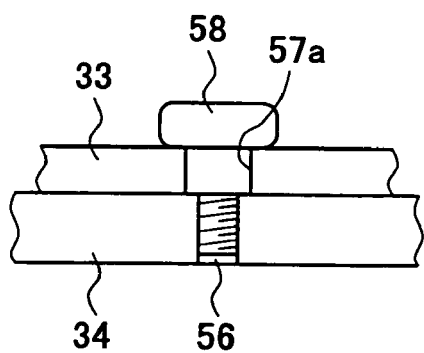
FIG. 12 is a longitudinal sectional view of a part of positioning means.
Figure 13:
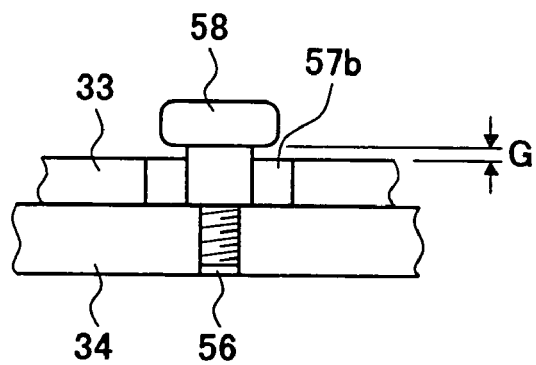
FIG. 13 is a longitudinal sectional view of another part of the positioning means.

Next, the fourth embodiment of the present invention is discussed with reference to FIG. 11 through FIG. 13. FIG. 11 is a perspective view showing a structure of the lighting device of the fourth embodiment of the present invention. FIG. 12 is a longitudinal sectional view of a part of positioning means. FIG. 13 is a longitudinal sectional view of another part of the positioning means.

In this embodiment, a lighting device 55 is provided for lighting the document D situated on the contact glass 12 from a lower side of the contact glass 12. The image reading apparatus 13 (See FIG. 4) is formed by the lighting device 55 and the CCD 17 (See FIG. 4) reading a reflection light (reading light) reflected by the document D after the light output from the lighting device 55 is irradiated on the document D.

The lighting device 55 includes the LED array substrate 30 and the light leading member 31. The LED array substrate 30 includes plural LEDs 32. The LEDs 32 are arranged and fixed in a straight line state at a designated equal pitch at the substrate 33 having a linear configuration. The LEDs 32 are arranged in a longitudinal direction of the substrate 33. This arrangement direction is consistent with a main scanning direction of the document D at the time when an image is read in a case where the lighting device 55 is installed in the image reading apparatus 13.

A holding part 34 is formed in a body at a side of the incident surface 31a of the light leading member 31. The holding part 34 holds the LED array substrate 30 and extends along a longitudinal direction of the light leading member 31. In the holding part 34, a mounting surface 34a is formed so as to be in parallel with a longitudinal direction of the light leading member 31 and orthogonal to the incident surface 31a. The LED array substrate 30 is attached to the holding part 34 in a direction so that a bottom surface of the substrate 33 is mounted on the mounting surface 34a.

Plural installation screw holes 56 are formed in the holding part 34 along the longitudinal direction of the light leading member 31. Plural positioning holes 57 (57a and 57b) are formed in the substrate 33 so as to face the installation screw holes 56 by holding the LED array substrate 30 to contact the holding part 34. The LED array substrate 30 is mounted on the mounting surface 34a. Positions of the positioning holes 57 and the installation screw holes 56 are adjusted in upper and lower directions. Then, fixing screws 58 inserted in the positioning holes 57 is screw-fixed to the corresponding installation screw holes 56 so that the LED array substrate 30 is fixed to the holding part 34.

A positioning member 51 causes a gap between each of the LEDs 32 arranged in a line state and the light leading member 31 to be constant by the holding part 34 having the mounting surface 34a and the installation screw holes 56 into which the fixing screws 58 are inserted and screw-fixed. The positioning member 51 also makes an arrangement direction of the LEDs 32 to be positioned along the longitudinal direction of the light leading member 31.

A single positioning hole 57a, situated in the center part in the longitudinal direction in the substrate 33, among plural positioning holes 57 (57a and 57b) has a circular hole shaped configuration having a substantially same outside diameter as the fixing screw 58. The length along the longitudinal direction in the substrate 33 of other positioning holes 57b is longer (elongated) than the diameter of the fixing screw 58. The length along a direction perpendicular to the longitudinal direction in the substrate 33 of other positioning holes 57b is the substantially the same as the diameter of the fixing screw 58.

Under this structure, as shown in FIG. 11, the LED array substrate 30 is mounted on the mounting surface 34a of the holding part 34. Positions of the positioning holes 57 and the corresponding installation screw holes 56 face each other. Then, the fixing screws 58 inserted in the positioning holes 57 are screw-fixed to the installation screw holes 56 so that the LED array substrate 30 is fixed to the holding part 34.

The mounting surface 34a extends in parallel with the longitudinal direction of the light leading member 31. Hence, by mounting the LED array substrate 30 on the mounting surface 34a, it is possible to position plural LEDs 32 and the light leading member 31 so that the arrangement direction of the LEDs 32 is consistent with the longitudinal direction of the light leading member 31. In addition, by facing the installation screw holes 56 formed in the holding part 34 to the positioning holes 57 formed in the substrate 33 and screw-fixing the fixing screws 58, inserted in the positioning holes 57, into the corresponding installation screw holes 56, it is possible to cause the gap between each of the emission surface of the LEDs 32 and the incident surface 31a of the light leading member 31 to be made constant. Because of this, the light beams from the LEDs 32 are uniformly incident on the light leading member 31. It is possible to uniformly light the document D along a main scanning direction of the document D by the light that is led by the light leading member 31 after being output from the LEDs 32 and then output from the outputting surface 31b. Because of this, a light receiving property of light received by a CCD 17 is improved and therefore it is possible to improve the quality of an image formed by the printer engine 3 based on a result of reading by the image reading apparatus 13.

In this embodiment, a single positioning hole 57a, situated in the center part in the longitudinal direction in the substrate 33 has a circular hole shaped configuration having a substantially same outside diameter as the fixing screw 58. The length along the longitudinal direction in the substrate 33 of other positioning hole 57b is longer than the diameter of the fixing screw 58. The length along a direction perpendicular to the longitudinal direction in the substrate 33 of the other positioning hole 57b is substantially the same as the diameter of the fixing screw 58. Therefore, even if a thermal expansion difference (a thermal expansion difference in the direction along the longitudinal direction of the substrate 33 and the holding part 34) is generated between the holding part 34 and the substrate 33 due to a change of temperature, this thermal expansion difference can be accommodated by a gap between the internal circumferential surface of each of the positioning holes 57b and an external circumferential surface of the corresponding fixing screw 58, namely a gap existing along the longitudinal direction of the substrate 33 and the holding part 34. Hence, the generation of a bend of the holding part 34 or the substrate 33 due to the thermal expansion difference between the holding part 34 and the substrate 33 can be prevented. Hence, a position gap between the LEDs 32 and the light leading member 31 based on a bend due to thermal expansion difference can be prevented. Because of this, lighting for the document D can be further uniformly done along the main scanning direction of the document D.

It is preferable to form a fine gap G (See FIG. 13) between a head part of the fixing screw 58 being inserted in the positioning screw hole 57b and an upper surface of the substrate 33. The fine gap G accommodates a relative movement of the fixing screw 58 and the substrate 33 when a thermal expansion difference is generated.

Figure 14:
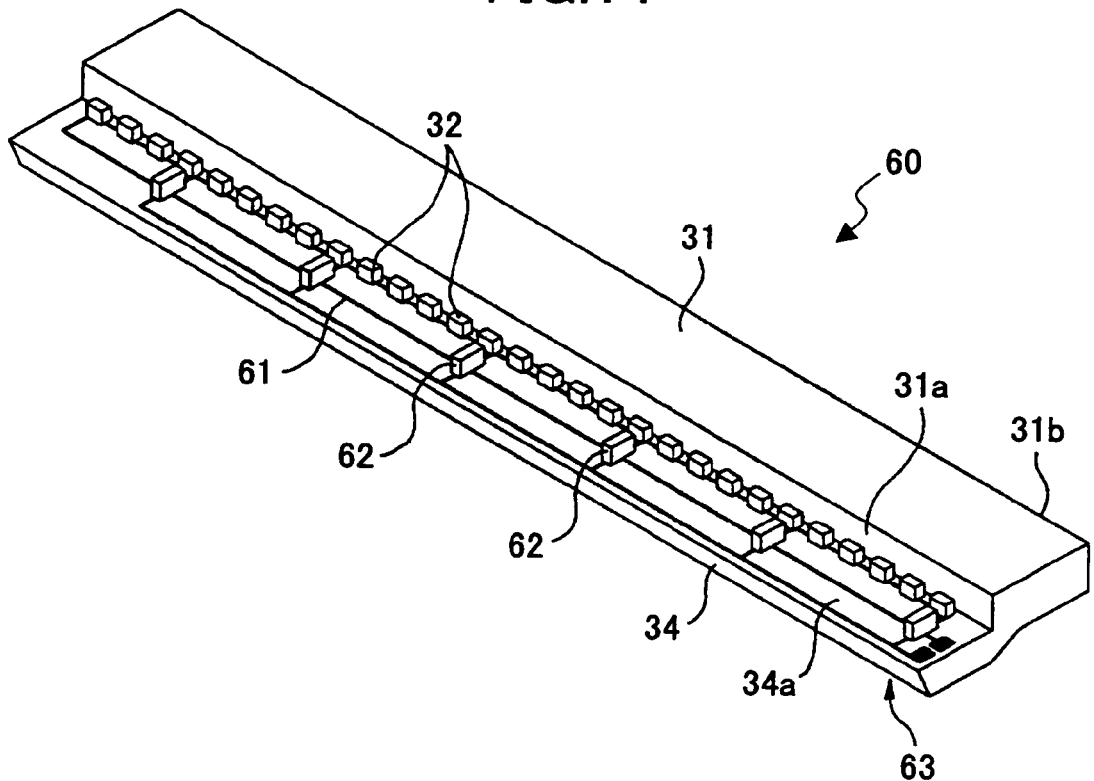
FIG. 14 is a perspective view showing a structure of a lighting device of a fifth embodiment of the present invention.
Figure 15:
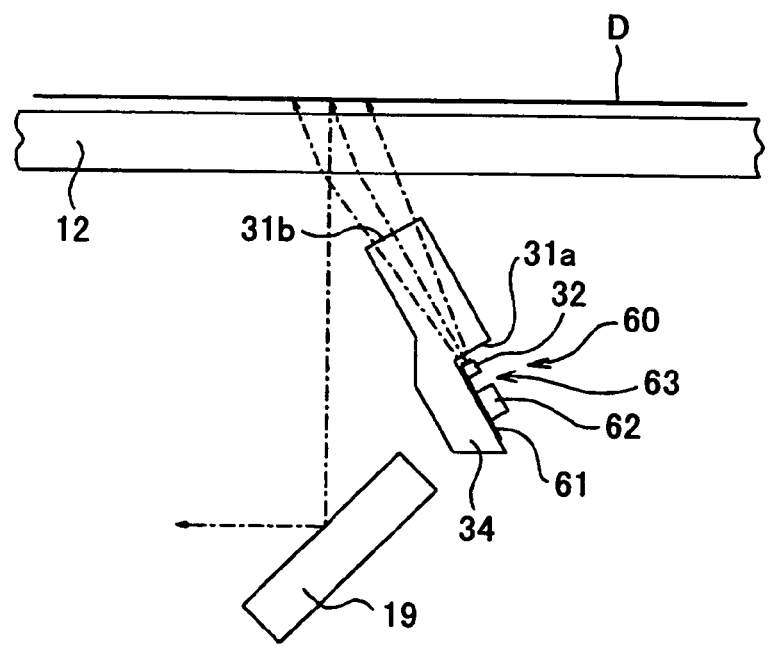
FIG. 15 is a longitudinal sectional view of the lighting device shown in FIG. 14.

Next, the fifth embodiment of the present invention is discussed with reference to FIG. 14 and FIG. 15. FIG. 14 is a perspective view showing a structure of the lighting device of the fifth embodiment of the present invention. FIG. 15 is a longitudinal sectional view of the structure of the lighting device.

In this embodiment, a lighting device 60 is provided for lighting the document D situated on the contact glass 12 from a lower side of the contact glass 12. The image reading apparatus 13 (See FIG. 4) is formed by the lighting device 60 and the CCD 17 (See FIG. 4) reading a reflection light (reading light) reflected by the document D after the light is output from the lighting device 60 is irradiated on the document D.

The lighting device 60 includes plural LEDs 32 and the light leading member 31. A holding part 34 is formed in a body at a side of the incident surface 31a of the light leading member 31. The holding part 34 extends along a longitudinal direction of the light leading member 31. In the holding part 34, a mounting surface 34a is formed so as to be in parallel with a longitudinal direction of the light leading member 31 and orthogonal to the incident surface 31a.

A wiring pattern 61 is formed on the mounting surface 34a of the holding part 34. Plural LEDs 32 and plural peripheral circuit elements 62 such as an electric current limiting resistance are connected to the wiring pattern 61. The LEDs 32 and the peripheral circuit elements 62 are positioned at designated positions on the wiring pattern 61 and solder-fixed so as to be mounted on the holding part 34.

A positioning member 63 makes a gap between each of the LEDs 32 arranged in a line state and the light leading member 31 constant by the holding part 34 having the mounting surface 34a and the wiring pattern 61 which is formed on the mounting surface 34a and to which the LEDs 32 and the peripheral circuit elements 62 are connected. The positioning member 63 also makes an arrangement direction of the LEDs 32 to be positioned along the longitudinal direction of the light leading member 31.

Under this structure, in this embodiment, the wiring pattern 61 is formed in the holding part 34 which is formed uniformly with the light leading member 31. The LEDs 32 and the peripheral circuit elements 62 connected to the wiring pattern 61 are mounted on the holding part 34.

The wiring pattern 61 is formed on the mounting surface 34a of the holding part 34 formed uniformly with the light leading member 31 and extending in parallel with the longitudinal direction of the light leading member 31. By connecting the plural LEDs 32 to the wiring pattern 61, it is possible to position plural LEDs 32 and the light leading member 31 so that the arrangement direction of the LEDs 32 is consistent with the longitudinal direction of the light leading member 31. In addition, it is possible to cause the gap between each of the emission surface of the LEDs 32 and the incident surface 31a of the light leading member 31 to be made constant. Because of this, the light beams from the LEDs 32 are uniformly incident on the light leading member 31. It is possible to uniformly light the document D along a main scanning direction of the document D by the light that is led by the light leading member 31 after being output from the LED 32 and then output from the outputting surface 31b. Because of this, a light receiving property of light received by a CCD 17 is improved and therefore it is possible to improve the quality of an image formed by the printer engine 3 based on a result of reading by the image reading apparatus 13.

Figure 16:
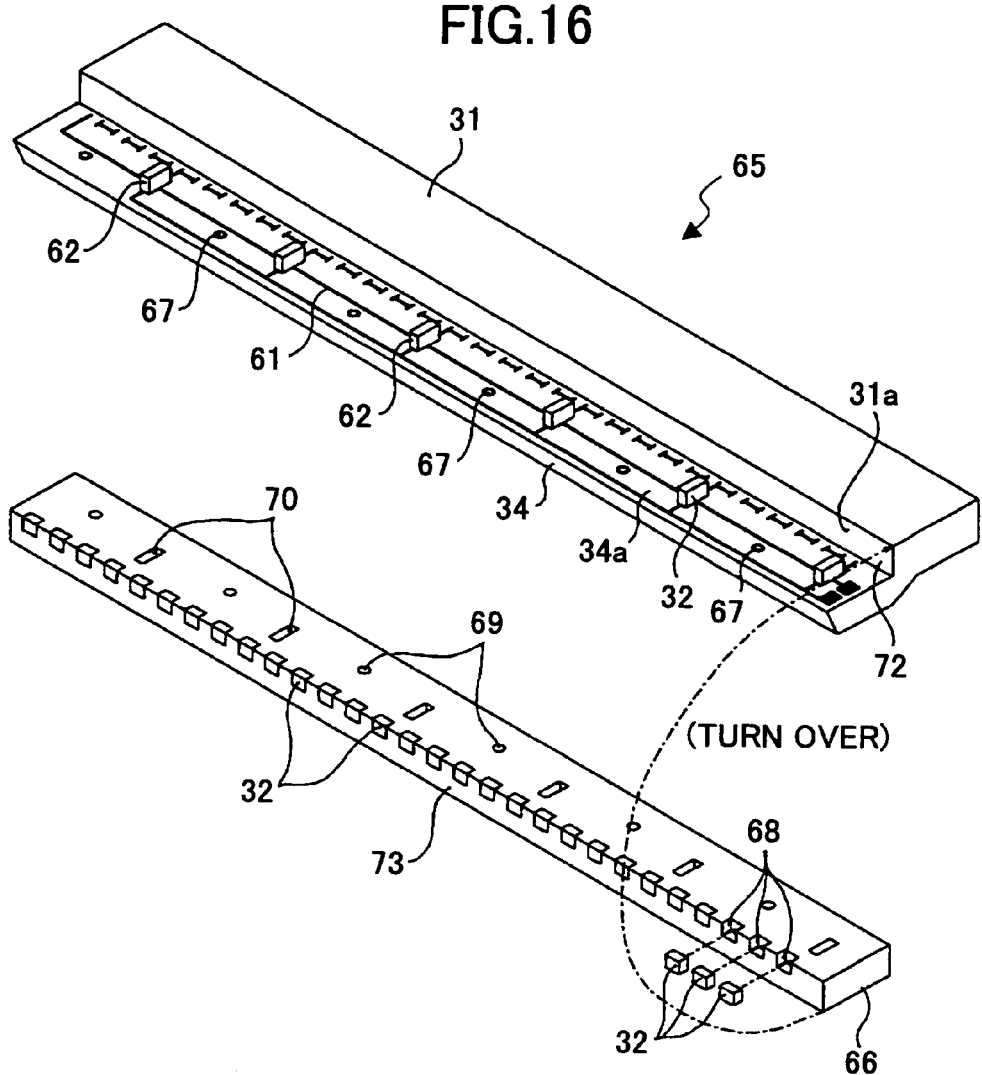
FIG. 16 is an exploded perspective view showing a structure of a lighting device of a sixth embodiment of the present invention.
Figure 17:
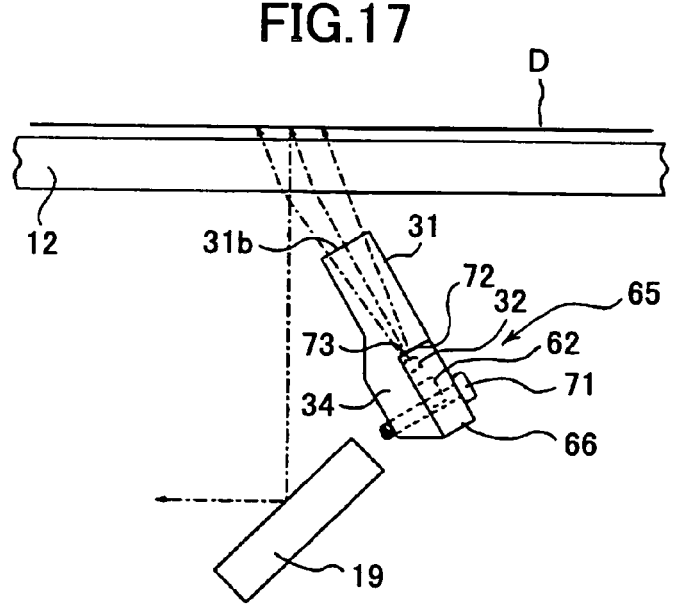
FIG. 17 is a longitudinal sectional view of the lighting device shown in FIG. 16.

Next, the sixth embodiment of the present invention is discussed with reference to FIG. 16 and FIG. 17. FIG. 16 is an exploded perspective view showing a structure of the lighting device of the sixth embodiment of the present invention. FIG. 17 is a longitudinal sectional view of the lighting device shown in FIG. 16.

In this embodiment, a lighting device 65 is provided for lighting the document D situated on the contact glass 12 from a lower side of the contact glass 12. The image reading apparatus 13 (See FIG. 4) is formed by the lighting device 65 and the CCD 17 (See FIG. 4) reading a reflection light (reading light) reflected by the document D after the light output from the lighting device 65 is irradiated on the document D.

The lighting device 65 includes plural LEDs 32, the light leading member 31, and a holding member 66 holding the LEDs 32. A holding part 34 is formed in a body at a side of the incident surface 31a of the light leading member 31. The holding part 34 extends along a longitudinal direction of the light leading member 31. In the holding part 34, a mounting surface 34a is formed so as to be in parallel with a longitudinal direction of the light leading member 31 and orthogonal to the incident surface 31a.

A wiring pattern 61 is formed on the mounting surface 34a of the holding part 34. Plural peripheral circuit elements 62 such as an electric current limiting resistance are connected to the wiring pattern 61. The peripheral circuit elements 62 are positioned at designated position on the wiring pattern 61 and solder-fixed so as to be mounted on the holding part 34. Plural screw holes 67 are formed at positions in the holding part 34 along the longitudinal direction of the holding part 34.

Plural press-fitting concave parts 68 for the point light sources, plural screw insertion holes 69, and plural escaping holes 70 are formed in the holding member 66. The press-fitting concave parts 68 for the point light sources, screw insertion holes 69, and escaping holes 70 are arranged in a straight line state along the longitudinal direction of the holding member 66. The LEDs 32 are light-press-fitted into the press-fitting concave parts 68 for the point light sources. The peripheral circuit elements 62 fit in the escaping holes 70 by fixing the holding member 66 to the holding part 34. The holding member 66 light-press-fits the LEDs 32 into the press-fitting concave parts 68 for the point light sources, which makes the LED 32 face the electrical connection position over the wiring pattern 61, and makes the screw insertion holes 69 face the corresponding screw holes 67, so as to be mounted on the mounting surface 34a of the holding part 34. The holding member 66 is fixed to the holding part 34 by screw-fixing the fixing screw 71 inserted in the screw insertion hole 69 with the screw holes 67. The LEDs 32 are pressed and connected at the designated position on the wiring pattern 61 by the above-discussed fixing. The arrangement direction of the press-fitting concave parts 68 for the point light sources is consistent with the main scanning direction of the document D at the time when the image is read in a case where the lighting device 65 is installed in the image reading apparatus 13.

An area which is a part of the incident surface 31a of the light leading member 31 and is adjacent to the mounting surface 34a works as a contact standard surface 72. A surface which is along a longitudinal direction in the holding member 66 and faces the contact standard surface 35 by mounting the holding member 66 on the holding part 34 is a contact surface 73 which contacts the contact standard surface 72. A positioning member 74 is formed in the light leading member 31. The positioning member 74 makes a gap between each of the LEDs 32 arranged in a line state and the light leading member 31 constant by the holding part 34 having the mounting surface 34a on which the wiring pattern 61 is formed and the contact standard surface 72. The positioning member 37 also makes an arrangement direction of the LEDs 32 be positioned along the longitudinal direction of the light leading member 31.

The holding member 66 is made of metal such as aluminum, copper, an aluminum alloy, or a copper alloy. By using a die-casting method, an extrusion method, or a sintering method, for example, as a method for forming the holding member 66 made of metal, it is possible to easily form the holding member 66 having a large number of small press-fitting concave parts 68 for the point light sources and escaping holes 70.

Under this structure, the holding member 66 holding the LEDs 32 is fixed to the holding part 34 where the wiring pattern 61 is formed by using the fixing screws 71 so that the LEDs 32 are pressed and connected to the wiring pattern 61 formed on the mounting surface 34a of the holding part 34. Because of this, it is possible to electrically connect the LEDs 32.

The mounting surface 34a extends in parallel with the longitudinal direction of the light leading member 31. Hence, by mounting the holding member 66 light-press-fitting the LEDs 32 to the press-fitting concave parts 68 for the point light sources on the mounting surface 34a, it is possible to position plural LEDs 32 and the light leading member 31 so that the arrangement direction of the LEDs 32 is consistent with the longitudinal direction of the light leading member 31. In addition, by contacting the contact surface 73 of the holding member 66 with the contact standard surface 72 of the light leading member 31, it is possible to cause the gap between each of the LEDs 32 and the incident surface 31a of the light leading member 31 to be made constant. Because of this, the light beams from the LEDs 32 are uniformly incident on the incident surface 31a of the light leading member 31. It is possible to uniformly light the document D along a main scanning direction of the document D by the light that is led by the light leading member 31 after being output from the LED 32 and then output from the outputting surface 31b. Because of this, a light receiving property of a light received by a CCD 17 is improved and therefore it is possible to improve the quality of an image formed by the printer engine 3 based on a result of reading by the image reading apparatus 13.

Furthermore, according to this embodiment, the LED 32 is simply light-press fitted to the press-fitting concave parts 68 for the point light sources of the holding member 66. Hence, if a certain LED 32 does not work, only the LED 32 which does not work is exchanged. Hence, it is not necessary to exchange the entirety of plural LEDs 32. It is also not necessary to exchange the entirety of plural LEDs 32 including the light leading member 31. Hence, the maintenance when an LED 32 does not work can be implemented at low cost.

In addition, in the case where the holding member 66 is made of metal, it is possible to improve transferability and radiation-ability of heat generated by the LED 32 and the peripheral circuit element 62, so that it is possible to prevent the performance of the LEDs 32 and the peripheral circuit element 62 from degrading due to the influence of the heat.

In this embodiment, as well as the single positioning hole 57a of the fourth embodiment of the present invention (See FIG. 11 through FIG. 13), the screw insertion hole 69, situated in the center part in the longitudinal direction of the holding member 66 has a circular hole shaped configuration having a substantially same outside diameter as the fixing screw 71. The length along the longitudinal direction in the holding member 66 of other screw insertion hole 69 may be longer (elongated) than the diameter of the fixing screw 71. In this case, even if a thermal expansion difference (a thermal expansion difference in the direction along the longitudinal direction of the holding part 34 and the holding member 66) is generated between the holding part 34 and the holding member 66 depending on the change of the temperature, a generation of a bend of the holding part 34 or the holding member 66 due to the thermal expansion difference can be prevented. Hence, a position gap between the LEDs 32 and the light leading member 31 based on the bend due to a thermal expansion difference can be prevented. Because of this, lighting for the document D can be further uniformly done along the main scanning direction of the document D.

Figure 18:
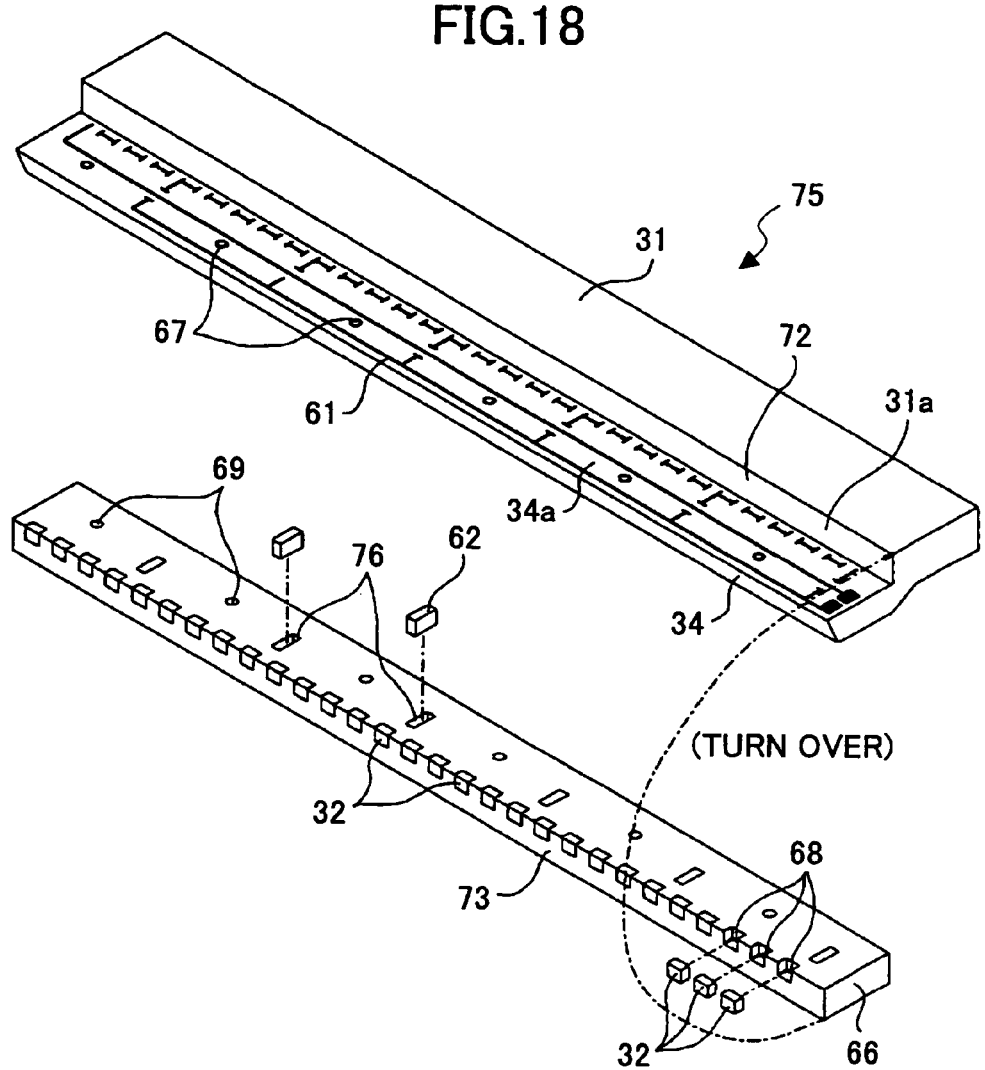
FIG. 18 is an exploded perspective view showing a structure of a lighting device of a seventh embodiment of the present invention.
Figure 19:
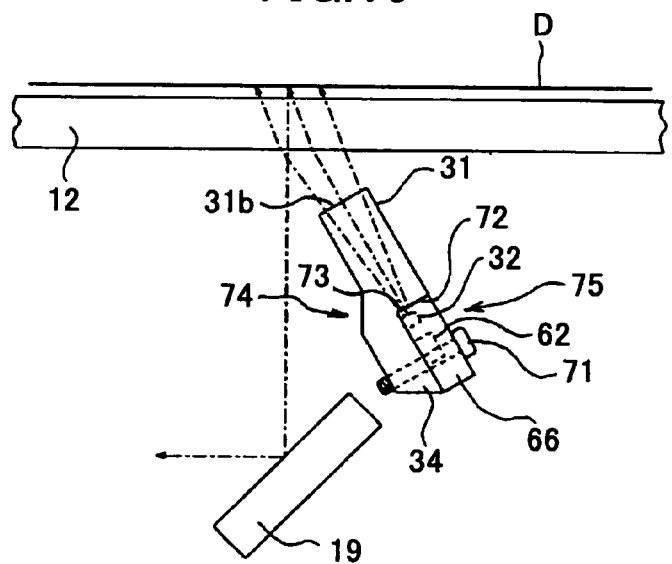
FIG. 19 is a longitudinal sectional view of the lighting device shown in FIG. 18.

Next, the seventh embodiment of the present invention is discussed with reference to FIG. 18 and FIG. 19. FIG. 18 is an exploded perspective view showing a structure of the lighting device of the seventh embodiment of the present invention. FIG. 19 is a longitudinal sectional view of the lighting device shown in FIG. 18.

In this embodiment, a lighting device 75 is provided for lighting the document D situated on the contact glass 12 from a lower side of the contact glass 12. The image reading apparatus 13 (See FIG. 4) is formed by the lighting device 75 and the CCD 17 (See FIG. 4) reading a reflection light (reading light) reflected by the document D after the light output from the lighting device 75 is irradiated on the document D.

A basic structure of the lighting device 75 is the same as the lighting device 65 of the sixth embodiment of the present invention. A different point of the lighting device 75 from the lighting device 65 is that plural press-fitting concave parts 76 for peripheral circuit elements, in addition to plural press-fitting concave parts 68 for the point light sources, are formed in the holding member 66 of the lighting device 75. The LEDs 32 are light-press-fitted into the press-fitting concave parts 68 for the point light sources and the peripheral circuit elements 62 such as the electric current limiting resistance are light-press-fitted into the press-fitting concave parts 76 for peripheral circuit elements. Because of this, the elements 62 are not solder-fixed to the wiring pattern 61 formed on the mounting surface 34a of the holding part 34.

In this embodiment, as well as the sixth embodiment, the positioning part 74 is formed by the holding part 34 having the mounting surface on which the wiring pattern 61 is formed and the contact standard surface 72.

Under this structure, the holding member 66 holding the LEDs 32 and the peripheral circuit elements 62 is fixed to the holding part 34 where the wiring pattern 61 is formed on the mounting surface 34a, by using the fixing screws 71, so that the LEDs 32 and the peripheral circuit elements 62 are pressed and connected to the wiring pattern 61. Because of this, it is possible to electrically connect the LEDs 32.

The mounting surface 34a extends in parallel with the longitudinal direction of the light leading member 31. Hence, by mounting the holding member 66 light-press-fitting the LEDs 32 into the press-fitting concave parts 68 for the point light sources on the mounting surface 34a, it is possible to position plural LEDs 32 and the light leading member 31 so that the arrangement direction of the LEDs 32 is consistent with the longitudinal direction of the light leading member 31. In addition, by contacting the contact surface 73 of the holding member 66 with the contact standard surface 72 of the light leading member 31, it is possible to cause the gap between each of the LEDs 32 and the incident surface 31a of the light leading member 31 to be made constant. Because of this, the light beams from the LEDs 32 are uniformly incident on the incident surface 31a of the light leading member 31.

In addition, according to this embodiment, only the wiring pattern 61 is formed on the mounting surface of the holding part 34. It is not necessary to solder-fix the elements connected to the wiring pattern 61 and therefore it is possible to reduce the number of working processes. Furthermore, it is possible to eliminate the influence of heat on the light leading member 31 at the time of solder-fixing. Therefore, it is possible to maintain a good light leading ability of the light leading member 31.

Furthermore, according to this embodiment, the peripheral circuit element 62 is simply light-press-fitted into the press-fitting concave parts 76 of the holding member 66. Hence, if a certain peripheral circuit element 62 does not work, only the peripheral circuit element 62 which does not work is exchanged. Hence, the maintenance when the peripheral circuit element 62 does not work can be implemented at low cost.

Figure 20:
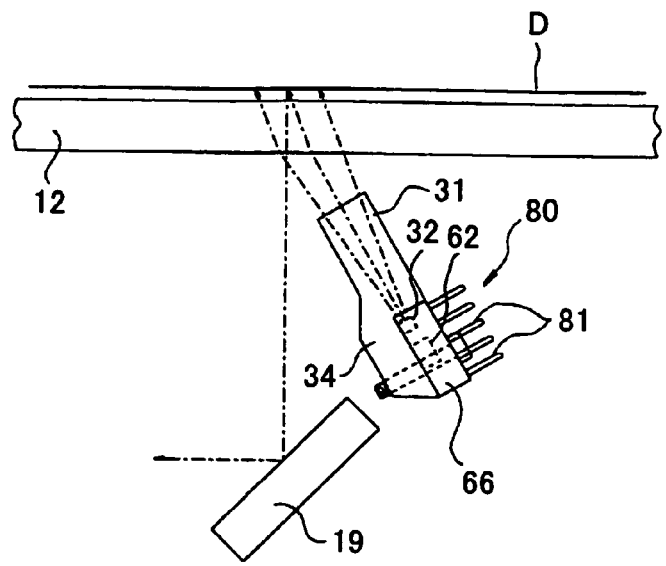
FIG. 20 is a longitudinal sectional view of a structure of a lighting device of an eighth embodiment of the present invention.

Next, the eighth embodiment of the present invention is discussed with reference to FIG. 20. FIG. 20 is a longitudinal sectional view of the lighting device.

In this embodiment, a lighting device 80 is provided for lighting the document D situated on the contact glass 12 from a lower side of the contact glass 12. The image reading apparatus 13 (See FIG. 4) is formed by the lighting device 80 and the CCD 17 (See FIG. 4) reading a reflection light (reading light) reflected by the document D after the light output from the lighting device 80 is irradiated on the document D.

A basic structure of the lighting device 80 is the same as the lighting device 65 of the sixth embodiment (See FIG. 16 and FIG. 17) and the lighting device 75 of the seventh embodiment (See FIG. 18 and FIG. 19) of the present invention. A different point of the lighting device 80 from the lighting devices 65 and 75 is that a heat radiation part 81 is formed at a rear surface side of a surface of the holding member 66 where the LEDs 32 and the peripheral circuit element 62 are light-press-fitted, in the lighting device 80. The heat radiation part 81 is formed in a fin-shaped state so as to be in a direction which the heat radiation part 81 extends to obliquely and upward at a position where the lighting device 80 is installed in the image reading apparatus 13.

In addition, in the case where the heat radiation part 81 is formed in the holding member 66, it is possible to improve radiation-ability of heat generated by the LED 32 and the peripheral circuit element 62, so that it is possible to prevent the performance of the LEDs 32 and the peripheral circuit element 62 from degrading due to the influence of the heat.

Figure 21:
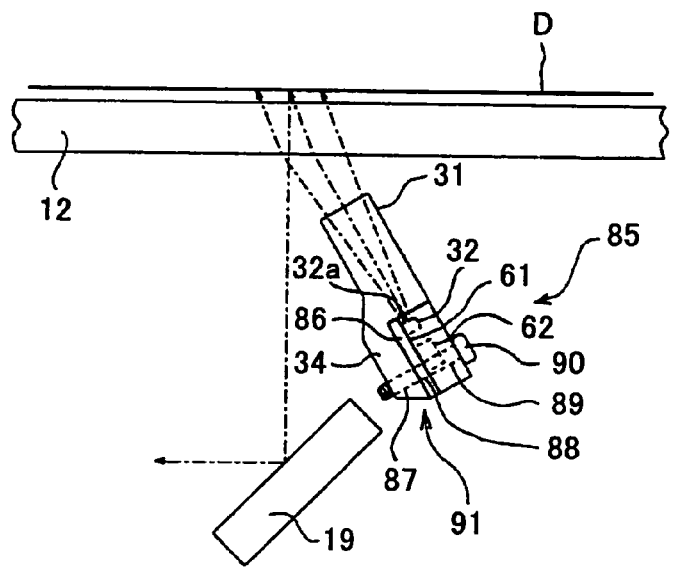
FIG. 21 is a longitudinal sectional view of a structure of a lighting device of a ninth embodiment of the present invention.

Next, the ninth embodiment of the present invention is discussed with reference to FIG. 21. FIG. 21 is a longitudinal sectional view of the lighting device.

In this embodiment, a lighting device 85 is provided for lighting the document D situated on the contact glass 12 from a lower side of the contact glass 12. The image reading apparatus 13 (See FIG. 4) is formed by the lighting device 85 and the CCD 17 (See FIG. 4) reading a reflection light (reading light) reflected by the document D after the light output from the lighting device 85 is irradiated on the document D.

The lighting device 85 includes a light leading member 31, the substrate 86 where the wiring pattern 61 is formed, plural LEDs 32, plural peripheral circuit elements 62, and the holding member 66 with plural press-fitting concave parts 76 for peripheral circuit elements and the press-fitting concave parts 68 for the point light sources. The LEDs 32 are light-press-fitted into the press-fitting concave parts 68 for the point light sources so as to be held. The peripheral circuit elements 62 are light-press-fitted into the press-fitting concave parts 76 for peripheral circuit element.

The holding part 34 is formed in a body at a side of the incident surface 31a of the light leading member 31. The holding part 34 holds the substrate 86 and the holding member 66 in a state where the substrate 86 and the holding member 66 are stacked.

The holding part 34 extends along a longitudinal direction of the light leading member 31. In the holding part 34, a mounting surface 34a is formed so as to be in parallel with a longitudinal direction of the light leading member 31 and orthogonal to the incident surface 31a. Plural screw holes 87 are formed at positions in the holding part 34 along the longitudinal direction of the holding part 34.

The substrate 86 has a linear rectangular configuration extending in a direction along a longitudinal direction of the light leading member 31 so as to assemble the lighting device 85 by using this substrate 86. Plural insertion holes 88 are formed in position along the longitudinal direction. Plural insertion holes 89 are formed in the holding member 86 in position along a longitudinal direction of the light leading member 31 by assembling the lighting device 85 by using this holding member 86. Positioning pins 90 are inserted into the corresponding insertion holes 88 and 89. A screw part is formed in a head end part of each of the positioning pin 90 and this screw part is screw-fixed with a corresponding screw hole 87 of the holding member 34. A positioning member 91 causes a gap between each of the LEDs 32 arranged in a line state and the light leading member 31 to be constant by the holding part 34 having the mounting surface 34a and the positioning pins 90. The positioning member 91 also causes an arrangement direction of the LEDs 32 to be positioned along the longitudinal direction of the light leading member 31.

Under this structure, the substrate 86 and the holding member 66 are mounted on the mounting surface 34a of the holding part 34 in a state where the substrate 86 and the holding member 66 are stacked. Positioning pins 90 are inserted into the insertion holes 88 and 89. The screw part formed in the head end part of the positioning pin 90 is screw-fixed with the screw hole 87 of the holding member 34. As a result of this, the holding member 66 and the substrate 86 are fixed to the holding part 34. The LEDs 32 and the peripheral circuit elements 62 are pressed and connected to the wiring pattern 61 formed on the substrate 86. Because of this, it is possible to electrically connect the LEDs 32 to the peripheral circuit element 62.

The mounting surface 34a extends in parallel with the longitudinal direction of the light leading member 31. Hence, by mounting the holding member 66 and the substrate 66 on the mounting surface 34a, it is possible to position plural LEDs 32 which are light-press-fitted in the press-fitting concave parts 68 for the point light sources of the holding member 66 and the light leading member 31 so that the arrangement direction of the LEDs 32 is consistent with the longitudinal direction of the light leading member 31. In addition, by screw-fixing the positioning pins 90 inserted in the insertion hole 89 of the holding member 66 mounted on the mounting surface 34a and the insertion hole 88 of the substrate 89 into the corresponding screw holes 87 of the holding part 34, it is possible to cause the gap between each of the LEDs 32 which are light-press-fitted in the press-fitting concave parts 68 for the point light sources of the holding member 66 and the incident surface 31a of the light leading member 31 to be made constant. Because of this, the light beams from the LEDs 32 are uniformly incident on the incident surface 31a of the light leading member 31. It is possible to uniformly light the document D along a main scanning direction of the document D by the light that is led by the light leading member 31 after being output from the LED 32 and then output from the outputting surface 31b. Because of this, a light receiving property of a light received by a CCD 17 is improved and therefore it is possible to improve the quality of an image formed by the printer engine 3 based on a result of reading by the image reading apparatus 13.

Furthermore, according to this embodiment, since the wiring pattern 61 is formed on an exclusive substrate 86, a special process for forming the wiring pattern on the mounting surface 34a of the holding part 34 is not necessary so that productivity can be improved.

Figure 22:
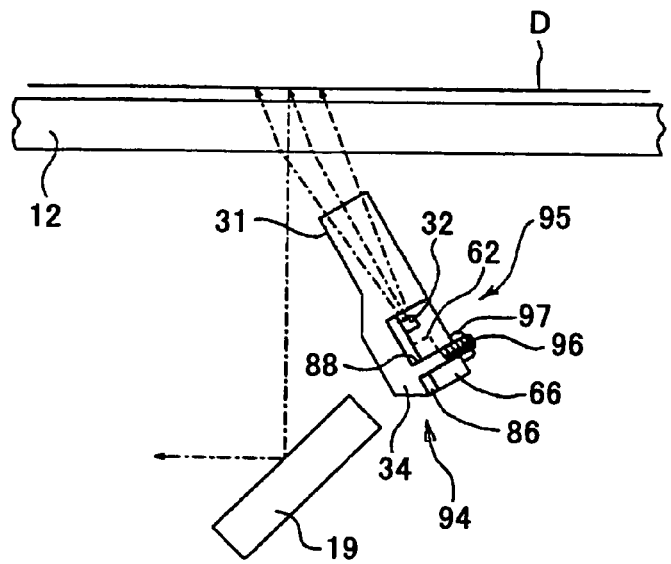
FIG. 22 is a longitudinal sectional view of a structure of a lighting device of a tenth embodiment of the present invention.

Next, the tenth embodiment of the present invention is discussed with reference to FIG. 22. FIG. 22 is a longitudinal sectional view of the lighting device.

In this embodiment, a lighting device 95 is provided for lighting the document D situated on the contact glass 12 from a lower side of the contact glass 12. The image reading apparatus 13 (See FIG. 4) is formed by the lighting device 95 and the CCD 17 (See FIG. 4) reading a reflection light (reading light) reflected by the document D after the light output from the lighting device 95 is irradiated on the document D.

A basic structure of the lighting device 95 is the same as the lighting device 85 of the ninth embodiment of the present invention. A different point of the lighting device 95 from the lighting device 85 is that the positioning pin 96 and the holding part 34 are formed in a body in the lighting device 95.

A screw part is formed in the head end part of the positioning pin 96. The insertion hole 88 of the substrate 86 and the insertion hole 88 of the holding member 66 have the positioning pin 96 inserted so that the substrate 86 and the holding member 66 are mounted on the mounting surface 34a of the holding part 34 in a state where the substrate 86 and the holding member 66 are stacked. A nut 97 is screw-fixed with the screw part of the head end part of the positioning pin 96. By screw-fixing the nut 97, the substrate 86 and the holding member 66 are fixed to the holding part 34.

A positioning member 98 causes a gap between each of the LEDs 32 arranged in a line state and the light leading member 31 to be made constant by the holding part 34 having the mounting surface 34a and the positioning pin 96. The positioning member 98 also makes an arrangement direction of the LEDs 32 to be positioned along the longitudinal direction of the light leading member 31.

Under this structure, the positioning pin 96 is formed with the holding member 34 in a body. Hence, when the substrate 86 and the holding member 66 are fixed to the holding part 34 by the positioning pin 96, it is possible to improve positioning precision between the holding member 66 and the holding part 34. Because of this, it is possible to uniformly light the document D along a main scanning direction of the document D. Hence, a light receiving property of a light received by a CCD 17 is improved and therefore it is possible to improve the quality of an image formed by the printer engine 3 based on a result of reading by the image reading apparatus 13.

The present invention is not limited to the above-discussed embodiments, but variations and modifications may be made without departing from the scope of the present invention.

This patent application is based on Japanese Priority Patent Application No. 2004-202998 filed on Jul. 9, 2004, the entire contents of which are hereby incorporated by reference.

What is claimed is:

1. An image reading apparatus, comprising:
    a plurality of point light sources, arranged in a straight line state, configured to output light to light a document;
    a light leading member, positioned in front in a light outputting direction of the light output from the point light sources, configured to receive the light incident on a surface of the light leading member, and to lead the received light so as to irradiate along a main scanning direction toward the document;
    a photoelectric conversion element configured to receive reflection light from the document;
    a point light source array substrate where the point light sources are provided in the line state; and
    a holding part having a mounting surface extending in parallel with the longitudinal direction of the light leading member, the mounting surface being where the point light source array substrate is mounted, wherein
    the light leading member includes a positioning unit configured to make a gap between one of the point light sources arranged in the line state and the light leading member the same as a gap between another of the point light sources and the light leading member, and to make an arrangement direction of the point light sources be positioned along a longitudinal direction of the light leading member.

2. The image reading apparatus as claimed in claim 1, wherein
    the positioning unit is formed by an insertion concave part and a contact standard surface,
    the insertion concave part is provided in the light leading member and extends in parallel with the longitudinal direction of the light leading member, and
    a contact surface formed in the substrate contacts the contact standard surface formed deep in the insertion concave part by inserting the substrate in the insertion concave part.

3. The image reading apparatus as claimed in claim 1, wherein
    the positioning unit is formed by an insertion concave part and an incident surface of the light leading member,
    the insertion concave part is provided in the light leading member and extends in parallel with the longitudinal direction of the light leading member, and
    an emitting surface of each of the point light source contacts the incident surface by inserting the substrate in the insertion concave part.

4. The image reading apparatus as claimed in claim 1, wherein the positioning unit is formed by the holding part and a plurality of installation screw holes,
    the holding part is provided in the light leading member, and
    the installation screw holes are formed in the holding part, face a plurality of positioning holes formed in the substrate, and have a structure where fixing screws inserted in the positioning holes are screw-fixed with the installation screw holes, by mounting the point light source array substrate on the mounting surface.

5. The image reading apparatus as claimed in claim 4, wherein one of a plurality of positioning holes, situated in the center part in the longitudinal direction in the substrate, has a circular hole shaped configuration having a substantially same outside diameter as the fixing screw,
    a length along the longitudinal direction in the substrate of the other positioning hole is longer than a diameter of the fixing screw, and
    the length along a direction perpendicular to the longitudinal direction in the substrate of the other positioning hole is the substantially same as the diameter of the fixing screw.

6. The image reading apparatus as claimed in claim 1, wherein the positioning unit is formed by the holding part and a wiring pattern,
    the holding part is provided in the light leading member, and the wiring pattern is formed on the mounting surface and is connected to the point light source.

7. The image reading apparatus as claimed in claim 1, further comprising:
a holding member having a plurality of press-fitting concave parts for the point light sources, wherein
the point light sources are press-fitted in the press-fitting concave parts;
the positioning unit is formed by the holding part and a contact standard surface,
the holding part is provided in the light leading member,
a wiring pattern is formed on the mounting surface, and
a contact surface formed in the holding member contacts the contact standard surface formed on the light leading member, by mounting the holding member having one of the point light sources is light press fitted in the press-fitting concave part for the point light source on the mounting surface so that the point light source is connected to the wiring pattern.

8. The image reading apparatus as claimed in claim 7, wherein a press-fitting concave part for a peripheral circuit element where the peripheral circuit element is light-press-fitted is formed in the holding part, and
the peripheral circuit element which is light-press-fitted in the press-fitting concave part for the peripheral circuit element is connected to the wiring pattern.

9. The image reading apparatus as claimed in claim 7, wherein the holding member is made of metal.

10. The image reading apparatus as claimed in claim 7, wherein the holding member has a heat radiation part.

11. The image reading apparatus as claimed in claim 1, further comprising:
a holding member having a plurality of press-fitting concave parts for the point light sources, the press-fitting concave parts being parts into which the point light sources are press-fitted; and
a substrate where a wiring pattern is formed, wherein the positioning unit is formed by the holding part and a positioning pin, wherein
the holding part is provided in the light leading member,
the substrate and the holding member are stacked,
the positioning pin is fixed to the holding part so as to pierce the substrate and the holding member for position fixing, and
the substrate is mounted on the mounting surface, in a state where the point light source light-press-fitted in the press-fitting concave part is connected to the wiring pattern.

12. The image reading apparatus as claimed in claim 11, wherein the positioning pin is formed in a body with the holding part.

13. The image reading apparatus as claimed in claim 1, wherein the mounting surface of the holding part is uniformly formed with the light leading member.

14. The image reading apparatus as claimed in claim 1, wherein the mounting surface of the holding part is formed separately from the light leading member.

15. The image reading apparatus as claimed in claim 1, further comprising:
a contact standard surface having a structure where a contact surface formed in the point light source array substrate contacts the contact standard surface by mounting the point light source array substrate on the mounting surface.

16. The image reading apparatus as claimed in claim 15, wherein the holding part and the contact standard surface are formed in the light leading member.

17. An image forming apparatus, comprising:
an image reading apparatus; and
a printer engine configured to form an image on a recording medium corresponding to image data read by the image reading apparatus,
wherein the image reading apparatus includes
a plurality of point light sources, arranged in a straight line state, configured to output light to light a document;
a light leading member, positioned in front in a light outputting direction of the light output from the point light sources, configured to receive the light incident on a surface of the light leading member and to lead the received light so as to irradiate along a main scanning direction toward the document;
a photoelectric conversion element configured to receive reflection light from the document;
a point light source array substrate where the point light sources are provided in the line state; and
a holding part having a mounting surface extending in parallel with the longitudinal direction of the light leading member, the mounting surface being where the point light source array substrate is mounted,
the light leading member including a positioning unit configured to make a gap between each of the point light sources arranged in the line state and the light leading member the same as a gap between another of the point light sources and the light leading member, and to make an arrangement direction of the point light sources be positioned along a longitudinal direction of the light leading member.

18. The image reading apparatus as claimed in claim 17, wherein the mounting surface of the holding part is uniformly formed with the light leading member.

19. The image reading apparatus as claimed in claim 17, wherein the mounting surface of the holding part is formed separately from the light leading member.

20. The image reading apparatus as claimed in claim 17, further comprising:
a contact standard surface having a structure where a contact surface formed in the point light source array substrate contacts the contact standard surface by mounting the point light source array substrate on the mounting surface.

21. The image reading apparatus as claimed in claim 20, wherein the holding part and the contact standard surface are formed in the light leading member.

22. An image reading apparatus, comprising:
a plurality of point light sources, arranged in a straight line state, configured to output light to light a document;
leading means for receiving the light incident on a surface of the leading means, and for leading the received light so as to irradiate along a main scanning direction toward the document, the leading means positioned in front in a light outputting direction of the light output from the point light sources;
means for receiving reflection light from the document;
a point light source array substrate where the point light sources are provided in the line state; and
a holding part having a mounting surface extending in parallel with the longitudinal direction of the leading means, the mounting surface being where the point light source array substrate is mounted,
wherein the leading means includes positioning means for making a gap between one of the point light sources arranged in the line state and the leading means the same as a gap between another of the point light sources and the leading means, and for making an arrangement direction of the point light sources be positioned along a longitudinal direction of the leading means.

23. The image reading apparatus as claimed in claim 22, wherein the mounting surface of the holding part is uniformly formed with the leading means.

24. The image reading apparatus as claimed in claim 22, wherein the mounting surface of the holding part is formed separately from the leading means.

25. The image reading apparatus as claimed in claim 22, further comprising:

a contact standard surface having a structure where a contact surface formed in the point light source array substrate contacts the contact standard surface by mounting the point light source array substrate on the mounting surface.

26. The image reading apparatus as claimed in claim 25, wherein the holding part and the contact standard surface are formed in the leading means.

* * * * *